(12) United States Patent
Nakamura

(10) Patent No.: US 11,624,619 B2
(45) Date of Patent: Apr. 11, 2023

(54) VEHICLE, CAR NAVIGATION SYSTEM, AND INFORMATION PROVIDING APPARATUS

(71) Applicant: Toyota Jidosha Kabushiki Kaisha, Toyota (JP)

(72) Inventor: Toru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 16/916,624

(22) Filed: Jun. 30, 2020

(65) Prior Publication Data

US 2021/0003408 A1    Jan. 7, 2021

(30) Foreign Application Priority Data

Jul. 2, 2019    (JP) .............................. JP2019-123489

(51) Int. Cl.
```
G01C 21/34    (2006.01)
B60K 35/00    (2006.01)
B60L 50/60    (2019.01)
B60Q 9/00     (2006.01)
G01S 19/42    (2010.01)
```
(Continued)

(52) U.S. Cl.
CPC .......... G01C 21/3407 (2013.01); B60K 35/00 (2013.01); B60L 50/66 (2019.02); B60L 53/66 (2019.02); B60Q 9/00 (2013.01); G01C 21/3679 (2013.01); G01S 19/42 (2013.01); B60K 2370/152 (2019.05); B60K 2370/157 (2019.05)

(58) Field of Classification Search
USPC ........................................................ 701/428
See application file for complete search history.

(56) References Cited

U.S. PATENT DOCUMENTS

2012/0249068 A1* 10/2012 Ishida .................... G07F 15/008
                                                               320/109
2014/0077766 A1*  3/2014 Takeuchi ................ B60L 55/00
                                                               320/128

(Continued)

FOREIGN PATENT DOCUMENTS

JP    2001215124 A     8/2001
JP    2011203174 A    10/2011

(Continued)

*Primary Examiner* — Tyler D Paige
(74) *Attorney, Agent, or Firm* — Dinsmore & Shohl LLP

(57) ABSTRACT

A controller in a vehicle includes an obtaining unit that obtains facility information on a charging facility that can charge a power storage mounted on the vehicle, the facility information including position information and utility information in association with each other, the position information indicating a position of the charging facility, the utility information indicating an electric utility that manages the charging facility. The controller further includes at least one of a first notification unit and a second notification unit. The first notification unit causes a notification apparatus to give first information that indicates an electric utility, by using the facility information obtained by the obtaining unit. The second notification unit causes the notification apparatus to give second information that indicates a position of a charging facility, by using the facility information obtained by the obtaining unit.

17 Claims, 16 Drawing Sheets

(51) Int. Cl.
*B60L 53/66* (2019.01)
*G01C 21/36* (2006.01)

(56) References Cited

U.S. PATENT DOCUMENTS

| | | | | |
|---|---|---|---|---|
| 2014/0214321 A1* | 7/2014 | Kawamata | ......... | G01C 21/3476 |
| | | | | 340/901 |
| 2016/0052413 A1 | 2/2016 | Shimizu et al. | | |
| 2020/0350764 A1* | 11/2020 | Day | .......................... | H02J 3/14 |
| 2021/0284039 A1* | 9/2021 | Ando | ...................... | B60L 53/63 |

FOREIGN PATENT DOCUMENTS

| | | | |
|---|---|---|---|
| JP | 2011247816 A | | 12/2011 |
| JP | 2012048286 A | | 3/2012 |
| JP | 2012080726 A | | 4/2012 |
| JP | 2014056589 A | | 3/2014 |
| JP | 2017529038 A | | 9/2017 |
| WO | 2011077780 A1 | | 6/2011 |
| WO | 2013024521 A1 | | 2/2013 |
| WO | 20160310951 A1 | | 3/2016 |

\* cited by examiner

FIG.7

<<FACILITY INFORMATION DATABASE>>

| FACILITY ID | POSITION INFORMATION | UTILITY INFORMATION | TYPE INFORMATION | BACKFEEDING INFORMATION |
|---|---|---|---|---|
| E-ID1 | LATITUDE**, LONGITUDE** | ELECTRIC POWER UTILITY COMPANY E1 | AC | ADAPTED |
| E-ID2 | LATITUDE**, LONGITUDE** | ELECTRIC POWER UTILITY COMPANY E1 | DC | NOT ADAPTED |
| ⋮ | ⋮ | ⋮ | ⋮ | |
| E-ID21 | LATITUDE**, LONGITUDE** | ELECTRIC POWER UTILITY COMPANY X1 | AC | ADAPTED |
| E-ID22 | LATITUDE**, LONGITUDE** | ELECTRIC POWER UTILITY COMPANY X1 | DC | ADAPTED |
| ⋮ | ⋮ | ⋮ | ⋮ | |
| E-ID51 | LATITUDE**, LONGITUDE** | ELECTRIC POWER UTILITY COMPANY X2 | AC | NOT ADAPTED |
| E-ID52 | LATITUDE**, LONGITUDE** | ELECTRIC POWER UTILITY COMPANY X2 | DC | NOT ADAPTED |
| ⋮ | ⋮ | ⋮ | ⋮ | |

<<NEARBY AREA MODE>>

<<USER INPUT MODE>>

VEHICLE, CAR NAVIGATION SYSTEM, AND INFORMATION PROVIDING APPARATUS

CROSS REFERENCE TO RELATED APPLICATIONS

This nonprovisional application claims priority to Japanese Patent Application No. 2019-123489 filed with the Japan Patent Office on Jul. 2, 2019, the entire contents of which are hereby incorporated by reference.

BACKGROUND

Field

The present disclosure relates to a vehicle, a car navigation system, and an information providing apparatus, and particularly to a vehicle, a car navigation system, and an information providing apparatus that are suitable for energy management.

Description of the Background Art

WO2011/077780 discloses a power grid (power system) control system that prepares a ranking list based on a position and a power storage state of an electric vehicle and a position of a charging and discharging spot connected to a power grid and guides the electric vehicle to the charging and discharging spot in accordance with the ranking list.

SUMMARY

Energy management has recently increasingly been commercialized worldwide. For example, a scheme under which a demand side enters into a contract with an electric utility, adjusts power demand in accordance with a request from the contracted electric utility (which is also referred to as a "contracted utility" below), and receives a reward therefor from the contracted utility has been constructed.

An electric utility can balance between supply and demand of electric power with an approach called demand response (which is also referred to as "DR" below). DR is an approach to adjustment of an amount of power demand by requesting each demand side to suppress or increase power demand by issuing a demand response signal (which is also referred to as a "DR signal" below). The DR signal includes a DR signal that requests suppression of power demand (which is also referred to as a "DR suppression signal" below) and a DR signal that requests increase in power demand (which is also referred to as a "DR increase signal" below).

With widespread use of electrically powered vehicles (for example, an electric vehicle), an infrastructure for charging the electrically powered vehicles (which is referred to as a "charging infrastructure" below) has been introduced. As the charging infrastructure, charging facilities (which are generally also referred to as "charging stands") have been installed in public facilities, commercial facilities, accommodations, and parking lots (for example, service areas of highways). Such charging facilities are managed by a specific electric utility. The electric utility that manages charging facilities is also referred to as a "managerial utility" below. The managerial utility monitors an amount of electric power used in each charging facility under the control thereof.

A user can participate in DR requested from a contracted utility by using a charging facility installed at home (which is also referred to as a "home facility" below), by entering into the previously-described contract with the managerial utility of the home facility. It is not necessarily easy, on the other hand, for the user to participate in DR requested from the contracted utility by using a public charging facility (which is also referred to as a "public facility" below). In order for the user to participate in DR requested from the contracted utility (and for the user to obtain a reward based on the contract described previously), charging or discharging in accordance with DR at the charging facility managed by the contracted utility is required. Under the current circumstances, however, no service is available for providing a user with information that indicates an electric utility (a managerial utility) that manages the public facility, and it is difficult for the user to identify a public facility managed by the contracted utility.

Examples of the electric utility include an electric power utility company. The electric power utility company supplies electric power to each charging facility under the control thereof and monitors an amount of electric power used in each charging facility under the control thereof. In Japan where there are few electric power utility companies and the control area of main electric power utility companies is divided based on a region (for example, Hokkaido/Tohoku/Kanto/Hokuriku/Chubu/Kansai/Chugoku/Shikoku/Kyushu/Okinawa), an electric power utility company that manages a charging facility (managerial utility) may be estimated from a position of the charging facility. In a country where there are a number of electric power utility companies, however, it is not necessarily easy to estimate a managerial utility based on a position of a charging facility. For a charging facility located at a boundary where switchover of an electric power utility company occurs (for example, a boundary between a region under the control of one electric power utility company and a region under the control of another electric power utility company), it is not easy either in Japan to estimate a managerial utility based on a position of the charging facility. Since deregulation of electric utilities has been accelerated also in Japan, the number of electric utilities in Japan may drastically increase in the future.

The present disclosure was made to solve the problems above, and an object thereof is to provide information useful for identifying a charging facility managed by a prescribed electric utility. Another object of the present disclosure is to facilitate participation by using a public facility, of a demand side in DR requested by a contracted utility.

A vehicle according to the present disclosure includes a power storage that stores electric power for traveling and a controller that controls a notification apparatus that gives a notification to a user. The controller includes an obtaining unit that obtains facility information on a charging facility that charges the power storage, the facility information including position information and utility information in association with each other, the position information indicating a position of the charging facility, the utility information indicating an electric utility that manages the charging facility. The controller further includes at least one of a first notification unit and a second notification unit which will be described below.

The first notification unit causes the notification apparatus to give first information by using the facility information obtained by the obtaining unit, the first information indicating an electric utility that manages the charging facility located at a prescribed position (which is also referred to as a "target position" below). The second notification unit causes the notification apparatus to give second information by using the facility information obtained by the obtaining unit, the second information indicating a position of the charging facility managed by a prescribed electric utility (which is also referred to as a "target managerial utility" below).

As a target position is set, the first notification unit can give a user the first information that indicates a managerial utility of a charging facility located at the target position (which is also referred to as a "first target facility" below). The user can determine based on the first information whether or not the managerial utility of the first target facility is the prescribed electric utility (for example, the contracted utility). Therefore, with the first notification unit, the user more readily identifies a charging facility managed by a prescribed electric utility (for example, a contracted utility).

As a target managerial utility is set, the second notification unit can give the user the second information that indicates a position of a charging facility managed by the target managerial utility (which is also referred to as a "second target facility" below). The user can identify a position of the charging facility managed by the target managerial utility (for example, the contracted utility) based on the second information.

When there are a number of second target facilities, the second notification unit may give the user the second information that indicates positions of all second target facilities or may give the user the second information that indicates a position of at least one of the second target facilities (for example, at least one second target facility extracted under a prescribed rule).

According to the vehicle, while the user is on board the vehicle, the user more readily identifies a charging facility managed by a prescribed electric utility (for example, a contracted utility). When the user is requested by the contracted utility to participate in demand response (DR) while the vehicle is traveling, the user can identify a public facility (a public charging facility) managed by the contracted utility based on at least one of the first information given by the first notification unit and the second information given by the second notification unit and can participate in DR by using the identified public facility. Even though the user is requested to participate in DR at a position distant from his/her home, the user more readily participates in DR by using the public facility. A user who does not have a charging facility installed at home can also readily participate in DR by using a public facility.

In a configuration in which the controller includes both of the first notification unit and the second notification unit, the first notification unit may be started up when the user sets a target position and the second notification unit may be started up when the user sets a target managerial utility. The controller may select any of a first notification mode in which the first notification unit is used and a second notification mode in which the second notification unit is used, for executing the selected notification mode. The controller may select a notification mode based on an input from the user or switch between the notification modes in accordance with a situation. Any notification method may be applicable, and a notification may be given, for example, by representation, sound (including voice), or both of them.

The "electric utility" includes not only an electric power utility company but also an aggregator. The electric utility that manages the charging facility monitors an amount of electric power used in the charging facility (that is, an amount of supply of electric power to a demand side) and provides electric power to the demand side through the charging facility. The "charging facility" includes a charging facility adapted to backfeeding and a charging facility not adapted to backfeeding. The charging facility adapted to backfeeding is also referred to as a "charging and discharging facility" below. The charging and discharging facility charges a power storage of a vehicle with electric power supplied from a power grid and supplies electric power received from the vehicle to the power grid (backfeeding). The electric utility that manages the charging and discharging facility monitors also an amount of electric power backfed to the charging and discharging facility in addition to an amount of electric power used in the charging and discharging facility.

The controller may include the first notification unit and may further include a position obtaining unit and a first setting unit which will be described below. The position obtaining unit obtains a position of the vehicle. The first setting unit sets an area around the vehicle as the previously-described target position in the first notification unit by using the position of the vehicle obtained by the position obtaining unit.

When the area around the vehicle is set by the first setting unit and there are a plurality of charging facilities in the set area around the vehicle, the first notification unit causes the notification apparatus to give the first information for each of the plurality of charging facilities.

In the vehicle, the first setting unit sets in the first notification unit, an area around the vehicle as the target position based on the position of the vehicle. The user can recognize an electric utility that manages each charging facility located in the area around the vehicle based on the first information given by the first notification unit. For example, when the user is requested by the contracted utility to participate in DR while the vehicle is traveling, the user can search for a public facility managed by the contracted utility while the vehicle is traveling. When the public facility managed by the contracted utility is found, the user can participate in DR by using the public facility.

The controller may include the first notification unit and may further include a first input unit that accepts an input of the target position by a user. According to such a configuration, the user can set any target position in the first notification unit. The user can know a managerial utility of the charging facility located at the input target position based on the first information given by the first notification unit.

The controller may include the second notification unit and may further include a second input unit that accepts an input of the target managerial utility by a user. According to such a configuration, the user can set any target managerial utility in the second notification unit. The user can know a position of a charging facility managed by the input target managerial utility based on the second information given by the second notification unit.

The controller may include the second notification unit and may further include a DR receiver and a second setting unit which will be described below. The DR receiver receives a DR signal that represents a content of demand response requested by a DR electric utility (a designated electric utility). When timing of start of the demand response (which is also referred to as "DR start timing" below) indicated by the DR signal received by the DR receiver will come within a prescribed time period from the current time, the second setting unit sets the DR electric utility as the prescribed electric utility in the second notification unit.

In the vehicle, when timing of start of demand response (DR) requested by the DR electric utility (for example, the contracted utility) is close to the current time, the second setting unit sets the DR electric utility as the target managerial utility in the second notification unit. The user can identify the charging facility (for example, the public facility) managed by the DR electric utility based on the second information given by the second notification unit and can participate in DR by using the identified charging facility. The controller may further include a third input unit that accepts an input of the DR electric utility by the user.

The facility information may include the position information of the charging facility, the utility information of the charging facility, and type information that indicates a charging type of the charging facility in association with one another. At least one of the first notification unit and the second notification unit in the controller may cause the notification apparatus to give third information that indicates the charging type of the charging facility by using the facility information obtained by the obtaining unit.

According to the configuration, the user can recognize the charging type of the charging facility based on the third information. The user can identify a charging facility managed by a prescribed electric utility (for example, a contracted utility) based on at least one of the first information and the second information, and determine whether or not the charging type of the charging facility is in conformity with the charging type of the vehicle based on the third information.

The obtaining unit may obtain the facility information from the outside of the vehicle or from a storage mounted on the vehicle. The vehicle may include, for example, a feature which will be described below.

The vehicle may further include a storage that contains a facility information database for a plurality of charging facilities that charge the power storage, and in the facility information database, the position information that indicates a position of each charging facility and the utility information that indicates an electric utility that manages each charging facility are databased in association with each other. The obtaining unit may obtain facility information from the facility information database. According to such a configuration, since the obtaining unit can obtain the facility information from the facility information database in the storage on a stand-alone basis without communicating with the outside, communication data can be reduced.

The notification apparatus may include at least one of a meter panel of the vehicle, a car navigation system mounted on the vehicle, a display provided on a windshield of the vehicle, a smart speaker mounted on the vehicle, and a portable terminal. Such a notification apparatus can give information in a manner readily recognizable by a user who is driving the vehicle.

The vehicle may further include a power feeder that supplies electric power stored in the power storage to the charging facility. The facility information may include the position information of the charging facility, the utility information of the charging facility, and backfeeding information in association with one another, the backfeeding information indicating whether or not the charging facility is adapted to backfeeding. At least one of the first notification unit and the second notification unit in the controller may cause the notification apparatus to give fourth information that indicates whether or not the charging facility is adapted to backfeeding by using the facility information obtained by the obtaining unit.

According to the configuration, the user can recognize whether or not the charging facility is adapted to backfeeding based on the fourth information. For example, when the user is requested by the electric utility to participate in DR suppression, the user can identify a charging and discharging facility managed by the electric utility based on at least one of the first information and the second information as well as the fourth information, and can allow discharging (that is, backfeeding) of the electrically powered vehicle to the identified charging and discharging facility.

A car navigation system according to the present disclosure includes a first storage that contains map information, a second storage that contains a facility information database, a display apparatus, and a controller that controls the display apparatus. In the facility information database, for a plurality of charging facilities that charge an electrically powered vehicle, position information that indicates a position of each charging facility and utility information that indicates an electric utility that manages each charging facility are databased in association with each other. The controller controls the display apparatus, by using the map information and the facility information database, to show on a map, the charging facility managed by a prescribed electric utility as being distinguished from the charging facility managed by another electric utility.

The car navigation system shows on the map, a charging facility managed by a prescribed electric utility as being distinguished from a charging facility managed by another electric utility. The user can readily identify the charging facility managed by the prescribed electric utility by looking at the map shown on the display apparatus.

An information providing apparatus according to the present disclosure includes a storage and a communication apparatus which will be described below. The storage contains a facility information database. In the facility information database, for a plurality of charging facilities that charge an electrically powered vehicle, position information that indicates a position of each charging facility and utility information that indicates an electric utility that manages each charging facility are databased in association with each other. The communication apparatus transmits at least one of the position information and the utility information contained in the facility information database.

The information providing apparatus can provide information (that is, at least one of position information and utility information) useful for identifying a charging facility managed by a prescribed electric utility (for example, a contracted utility).

An electrically powered vehicle refers to a vehicle that travels by using electric power and may be an electric vehicle (EV) or a plug-in hybrid vehicle (PHV).

The communication apparatus may transmit to communication equipment of the electrically powered vehicle, a DR signal that represents a content of demand response requested by a DR electric utility (a designated electric utility).

The information providing apparatus can transmit a DR signal and provide information (that is, at least one of position information and utility information) useful for a DR applicant by using the facility information database. Such an information providing apparatus readily provides a service useful for a DR applicant. The information providing apparatus may be implemented by an aggregator server.

The "communication equipment of the electrically powered vehicle" refers to communication equipment of an electrically powered vehicle registered in the information providing apparatus and may be communication equipment mounted on the electrically powered vehicle or a portable terminal carried by a user of the electrically powered vehicle.

When the communication apparatus receives an information provision request that designates a position (for example, a position coordinate) of one charging facility from communication equipment of the electrically powered vehicle, the communication apparatus may transmit the utility information associated with the position of the charging facility designated by the information provision request, by referring to the facility information database, to the communication equipment of the electrically powered vehicle.

When the communication apparatus receives an information provision request that designates an electric utility that manages the charging facility from communication equipment of the electrically powered vehicle, the communication apparatus may transmit the position information associated with the electric utility designated by the information provision request, by referring to the facility information database, to the communication equipment of the electrically powered vehicle.

When the communication apparatus receives an information provision request that designates a region from communication equipment of the electrically powered vehicle, the communication apparatus may transmit the position information and the utility information as being associated with each other, for each of all charging facilities located in the region designated by the information provision request, by referring to the facility information database, to the communication equipment of the electrically powered vehicle.

According to the information providing apparatus, information useful for identifying a charging facility managed by a prescribed electric utility (for example, a contracted utility) can be transmitted to communication equipment of the electrically powered vehicle. For example, when the electrically powered vehicle is requested by the electric utility to participate in DR, it can go to the charging facility managed by the electric utility based on the information transmitted from the information providing apparatus, and can perform charging or discharging in accordance with DR at the charging facility. At this time, the electrically powered vehicle may travel based on autonomous driving (for example, autonomous driving in an unmanned state).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a diagram showing an exemplary facility information DB included in the VGI system according to the first embodiment of the present disclosure.

DETAILED DESCRIPTION

Figure 1:
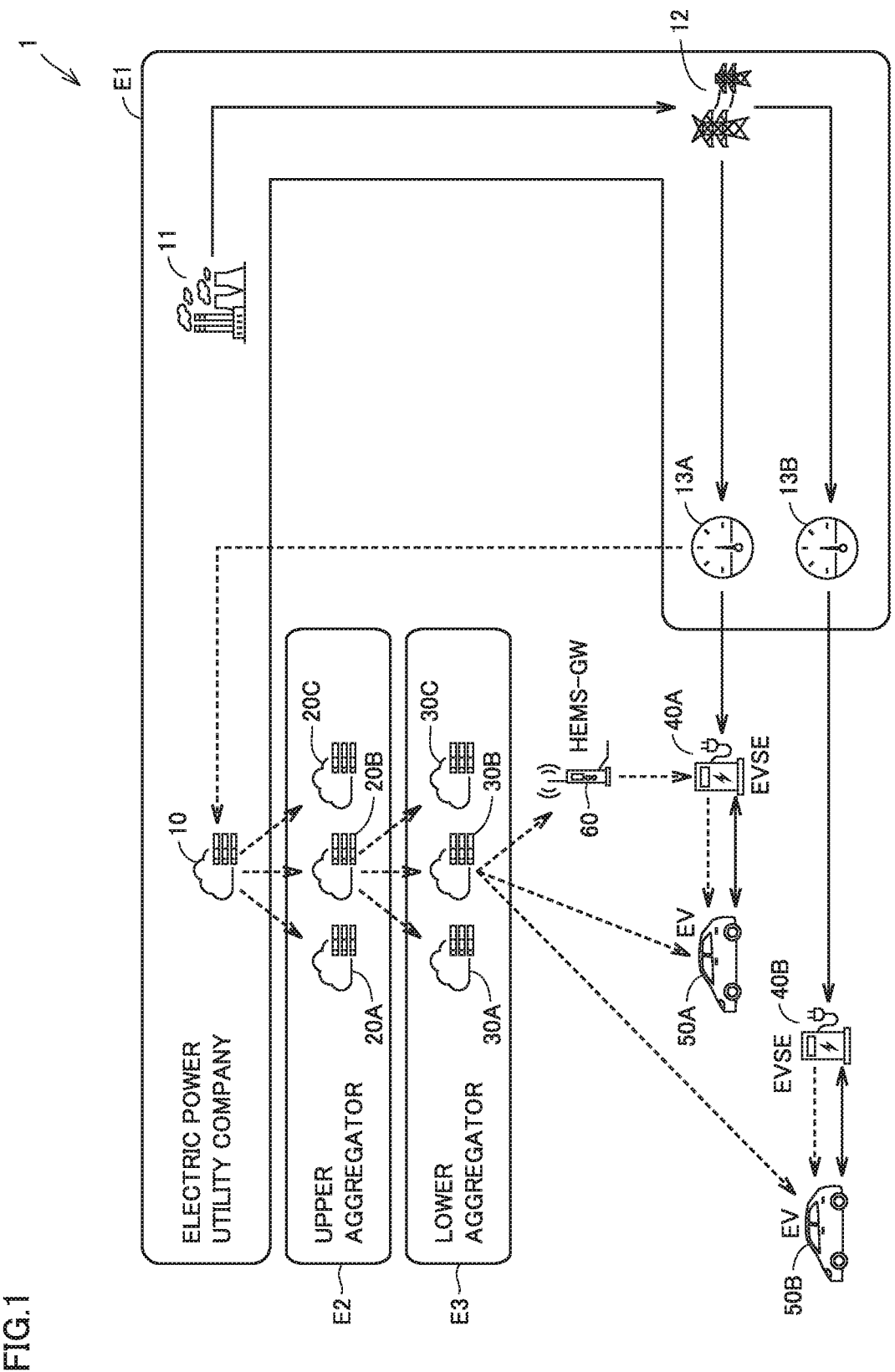
FIG. 1 is a diagram showing a configuration of a VGI system according to a first embodiment of the present disclosure.

An embodiment of the present disclosure will be described in detail below with reference to the drawings. The same or corresponding elements in the drawings have the same reference characters allotted and description thereof will not be repeated.

An electric power system dependent on a large-scale power plant (an intensive energy resource) possessed by an electric power utility company has recently been reviewed and a scheme for utilizing an energy resource possessed by each demand side (which is also referred to as "demand side resources (DSR)" below) has been constructed. The DSR functions as distributed energy resources (which are also referred to as "DER" below).

A virtual power plant (VPP) has been proposed as a scheme for utilizing the DSR for an electric power system. The VPP refers to a scheme in which a large number of DER (for example, DSR) are put together according to a sophisticated energy management technology that makes use of the Internet of Things (IoT) and the DER are remotely controlled as being integrated as if the DER functioned as a single power plant. In the VPP, an electric utility that puts the DER together to provide an energy management service is referred to as an "aggregator." An electric power utility company, for example, in coordination with an aggregator, can balance between supply and demand of electric power based on demand response (DR).

First Embodiment

In a vehicle grid integration (VGI) system according to this embodiment, a vehicle including a power storage (more specifically, an electric vehicle) is adopted as DSR for implementing the VPP.

FIG. 1 is a diagram showing a configuration of a VGI system according to a first embodiment. Referring to FIG. 1, a VGI system 1 includes an electric power utility company E1, an upper aggregator E2, and a lower aggregator E3.

Electric power utility company E1 generates and supplies electric power. Electric power utility company E1 can make a profit, for example, by dealing with a demand side (for example, an individual or a company) that uses electric power. Electric power utility company E1 maintains and manages a server 10, a power plant 11, a power transmission and distribution facility 12, and smart meters 13A and 13B.

Power plant 11 includes a power generator that generates electricity and supplies electric power generated by the power generator to power transmission and distribution facility 12. Any system for power generation by power plant 11 is applicable, and for example, any of thermal power generation, hydroelectric power generation, wind power generation, nuclear power generation, and solar photovoltaic power generation may be applicable. Power transmission and distribution facility 12 includes a power line, a substation, and an electricity distribution line and transmits and distributes electric power supplied from power plant 11. Power plant 11 and power transmission and distribution facility 12 construct a power grid (power system).

Each of smart meters 13A and 13B measures an amount of power usage each time a prescribed time period elapses (for example, each time thirty minutes elapse), stores the measured amount of power usage, and transmits the measured amount of power usage to server 10. For example, IEC (DLMS/COSEM) can be adopted as a protocol for communication between smart meters 13A and 13B and server 10. Each of smart meters 13A and 13B measures an amount of power usage in EVSE 40A and 40B which will be described later (for example, an amount of electric power used for charging of EVs 50A and 50B). Electric power utility company E1 corresponds to a managerial utility of each of EVSE 40A and EVSE 40B. Each of EVSE 40A and EVSE 40B according to this embodiment corresponds to an exemplary "charging facility" according to the present disclosure.

Each utility (which is also referred to as a "parent AG" below) belonging to upper aggregator E2 manages a plurality of utilities (each of which is also referred to as a "child AG" below) belonging to lower aggregator E3 and provides an energy management service by putting together amounts of electric power controlled by children AGs under the control thereof. The parent AG can make a profit, for example, by dealing with electric power utility company E1.

Server 10 manages information on a plurality of parent AGs (for example, parent AGs registered in server 10) under the control thereof. Identification information (ID) for identification of a parent AG is provided for each parent AG. Server 10 manages information for each parent AG as being distinguished based on an ID of the parent AG. The parent AG may procure capability (capacity) of supply of electricity not only from an electric vehicle (EV) but also from a resource other than the EV (for example, biomass). Upper aggregator E2 includes a plurality of servers (for example, servers 20A to 20C) provided for respective parent AGs. The server included in upper aggregator E2 is denoted as a "server 20" except for an example in which the servers are described as being distinguished from one another. Though FIG. 1 shows three servers 20 (servers 20A to 20C), any number of servers 20 may be included in upper aggregator E2 and ten or more servers may be included.

Each server 20 included in upper aggregator E2 manages information on children AGs (for example, children AGs registered in server 20) under the control thereof. Each utility (child AG) belonging to lower aggregator E3 controls an amount of electric power by requesting each demand side to suppress or increase power demand by issuing a demand response signal (DR signal). Identification information (ID) for identification of a child AG is provided for each child AG. Server 20 manages information for child AG as being distinguished based on an ID of the child AG. Lower aggregator E3 includes a plurality of servers (for example, servers 30A to 30C) provided for respective children AGs. The server included in lower aggregator E3 is denoted as a "server 30" below except for an example in which the servers are described as being distinguished from one another. Servers 30A to 30C shown in FIG. 1 are managed by common server 20 (for example, server 20B). Any number of servers 30 may be managed by each server 20 included in upper aggregator E2, and ten or more servers may be managed.

An electric vehicle (EV) is adopted as the DSR managed by a child AG (or server 30) in VGI system 1 shown in FIG. 1. The EV can be supplied with electric power by electric vehicle supply equipment (EVSE). In this embodiment, VGI system 1 includes both of EVSE adapted to an alternating-current electric power supply type (an AC type) and EVSE adapted to a direct-current electric power supply type (a DC type).

EVSE 40A included in VGI system 1 shown in FIG. 1 is home EVSE (that is, EVSE installed in a house). The home EVSE can be managed by a home energy management system-gateway (HEMS-GW). For example, EVSE 40A is managed by a HEMS-GW 60. EVSE 40B included in VGI system 1 shown in FIG. 1 is public EVSE. The public EVSE is installed, for example, in public facilities, commercial facilities, accommodations, and parking lots (for example, service areas of highways) as an infrastructure for charging of a power storage mounted on an electrically powered vehicle. Typical examples of public EVSE include a normal charger adapted to the AC type and a quick charger adapted to the DC type.

VGI system 1 includes a plurality of pieces of EVSE, a plurality of EVs, and a plurality of HEMS-GWs (only one of each of them being shown in FIG. 1). Any independent number of pieces of EVSE, EVs, and HEMS-GWs may be included in VGI system 1, and the number may be set to ten or more or one hundred or more. Each piece of EVSE, each EV, and each HEMS-GW included in VGI system 1 are denoted as "EVSE 40," an "EV 50," and "HEMS-GW 60," respectively, except for an example in which each of them is described as being distinguished. Each EV 50 included in VGI system 1 may be a vehicle owned by an individual (which is also referred to as a "POV" below) or a vehicle managed by a mobility as a service (MaaS) entity (which is also referred to as a "MaaS vehicle" below). In this embodiment, a user of each EV 50 included in VGI system 1 enters into a contract with electric power utility company E1. Under this contract, the user obtains the right to receive a reward from electric power utility company E1 when the user adjusts power demand in response to a request by electric power utility company E1. Electric power utility company E1 according to this embodiment corresponds to an exemplary "contracted utility."

Each server 30 included in lower aggregator E3 manages information on a plurality of EVs 50 (for example, EVs registered in server 30) under the control thereof. Identification information for identification of EV 50 (which is also referred to as a "vehicle ID" below) is provided for each EV 50. Server 30 manages information for each EV 50 as being distinguished based on the vehicle ID. Each server 30 included in lower aggregator E3 can communicate with each HEMS-GW 60 (for example, a HEMS-GW registered in server 30) under the control thereof.

EVSE 40A is connected to the power grid of electric power utility company E1 with smart meter 13A being interposed. An amount of power usage in EVSE 40A is measured by smart meter 13A and transmitted to server 10. EVSE 40B is connected to the power grid of electric power utility company E1 with smart meter 13B being interposed. An amount of power usage in EVSE 40B is measured by smart meter 13B and transmitted to server 10. Each of smart meters 13A and 13B included in VGI system 1 is denoted as a "smart meter 13" below except for an example in which the smart meters are described as being distinguished from each other.

Smart meter 13 is provided for each piece of EVSE 40 included in VGI system 1. Each piece of EVSE 40 included in VGI system 1 is managed by electric power utility company E1 and connected to the power grid provided by electric power utility company E1. Each piece of EVSE 40 included in VGI system 1 is supplied with electric power from electric power utility company E1. In VGI system 1, identification information for identification of EVSE 40 (which is also referred to as a "facility ID" below) is provided for each piece of EVSE 40, and server 10 manages an amount of power usage in each piece of EVSE 40 as being distinguished based on the facility ID. Electric power utility company E1 monitors an amount of electric power used in each piece of EVSE 40 included in VGI system 1 (that is, an amount of supply of electric power to a demand side) through smart meter 13 and provides electric power to the demand side through each piece of EVSE 40 included in VGI system 1.

A plurality of pieces of EVSE 40 included in VGI system 1 include a charging facility not adapted to backfeeding and a charging facility adapted to backfeeding (that is, a charging and discharging facility). The charging and discharging facility supplies electric power received from EV 50 to the power grid of electric power utility company E1 (that is, backfeeding). Smart meter 13 provided in the charging and discharging facility measures an amount of backfed electric power in addition to an amount of power usage.

Figure 2:
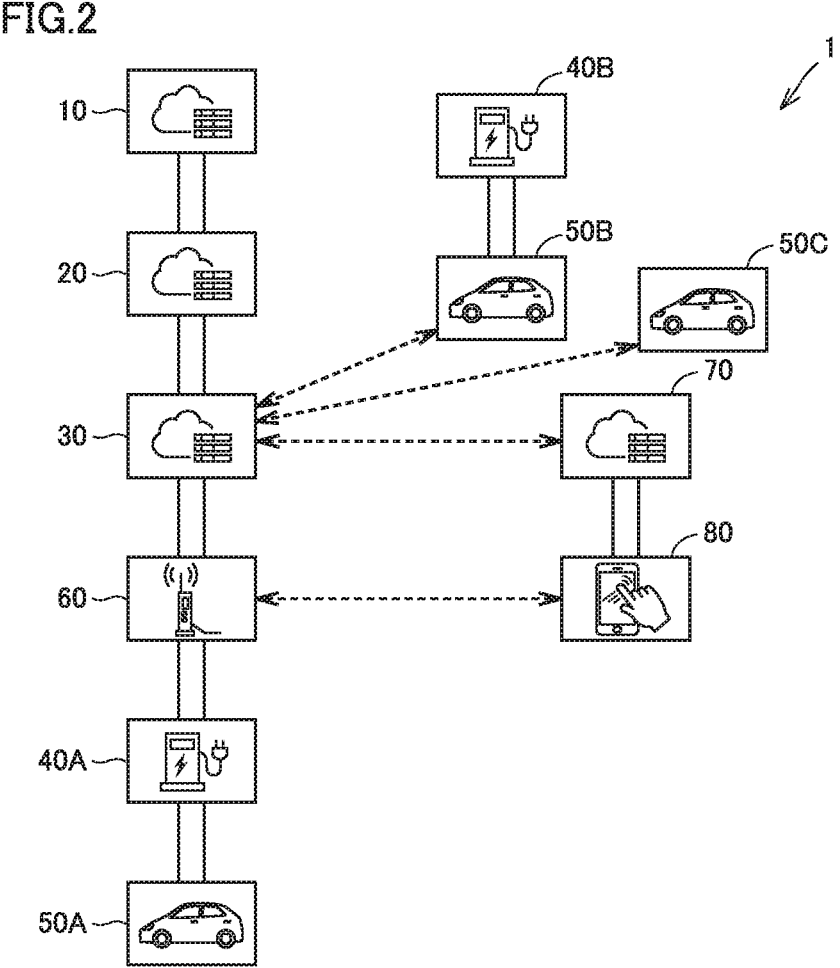
FIG. 2 is a diagram of a communication system of the VGI system shown in FIG. 1.

A function of each element included in VGI system 1 will be described below with reference to FIG. 2. FIG. 2 is a diagram of a communication system of VGI system 1. In FIG. 2, EV 50A is electrically connected to EVSE 40A (home EVSE) through a charging cable. EV 50B is electrically connected to EVSE 40B (public EVSE) through a charging cable. An EV 50C is traveling.

Referring to FIG. 2, in VGI system 1, server 10 and server 20 can communicate with each other. Server 20 and server 30 can also communicate with each other. Though communication between servers 10 and 20 and between servers 20 and 30 may be independently of any type, for example, a virtual private network (VPN) may be adopted.

Server 30 can communicate with each of each EV 50 (that is, EV 50A to 50C) and HEMS-GW 60. Server 30 and HEMS-GW 60 communicate with each other, for example, through the Internet. Server 30 and each EV 50 wirelessly communicate with each other, for example, through a mobile communication network (telematics).

HEMS-GW 60 and EVSE 40A communicate with each other, for example, through a local area network (LAN). The LAN may be wired or wireless LAN.

EVSE 40A and EV 50A communicate with each other through a charging cable. EVSE 40B and EV 50B communicate with each other also through a charging cable. Communication between EVSE 40A and EV 50A and between EVSE 40B and EV 50B may be independently of any type, and controller area network (CAN) or power line communication (PLC) may be adopted.

VGI system 1 further includes a data center 70 and a portable terminal 80 registered in data center 70. Data center 70 includes, for example, a server (not shown) that manages information. In this embodiment, a smartphone equipped with a touch panel display is adopted as portable terminal 80. Without being limited thereto, any portable terminal can be adopted as portable terminal 80, and for example, a tablet terminal, a portable game console, and a wearable device such as a smart watch can also be adopted.

Data center 70 communicates with server 30, for example, through the Internet. Data center 70 manages information on a plurality of registered portable terminals 80. Information on portable terminal 80 includes not only information on the terminal itself (for example, a communication address of portable terminal 80) but also information on a user who carries portable terminal 80 (for example, information that indicates an electric utility with which the user has contracted and a vehicle ID of EV 50 belonging to the user). Identification information for identification of portable terminal 80 (which is also referred to as a "terminal ID" below) is provided for each portable terminal 80 and data center 70 manages information for each portable terminal 80 as being distinguished based on the terminal ID. The terminal ID also functions as information for identification of a user (a user ID). Though FIG. 2 shows only a single portable terminal 80, each user carries portable terminal 80.

Prescribed application software (which is simply referred to as an "application" below) is installed in portable terminal 80, and portable terminal 80 exchanges information with each of HEMS-GW 60 and data center 70 through the application. Portable terminal 80 wirelessly communicates with each of HEMS-GW 60 and data center 70, for example, through the Internet.

Server 10 balances between supply and demand of electric power by using demand response (DR). When server 10 makes such adjustment, initially, it transmits a signal (which is also referred to as a "DR participation request" below) requesting each server 20 (for example, servers 20A to 20C shown in FIG. 1) included in upper aggregator E2 to participate in DR. The DR participation request includes a region of interest of DR, a type of DR (for example, DR suppression or DR increase), and a DR period.

When server 20 receives a DR participation request from server 10, it calculates an adjustable DR amount (that is, an amount of electric power that can be adjusted in accordance with DR) and transmits the amount to server 10. Server 20 can calculate the adjustable DR amount, for example, based on a total of DR capacities of children AGs (that is, a capacity with which the children AGs can address DR) under the control thereof. Server 20 can obtain the DR capacity of each child AG under the control thereof, for example, by making an inquiry to server 30. Server 10 determines a DR amount (that is, an amount of power adjustment asked to a parent AG) for each parent AG based on the adjustable DR amount received from each server 20 included in upper aggregator E2 and transmits a signal (which is also referred to as a "first DR execution instruction" below) instructing server 20 of each parent AG to execute DR. The first DR execution instruction includes a region of interest of DR, a type of DR (for example, DR suppression or DR increase), an amount of DR for the parent AG, and a DR period.

Server 30 sequentially obtains from each EV 50, information (for example, a position of a vehicle, a remaining capacity of a battery, a travel schedule, and a travel condition) representing a state of each EV 50 under the control thereof and stores the information. As a result of accumulation of such data, a history of charging and discharging and a history of travel of each EV 50 under the control are stored in server 30. Server 30 sequentially obtains from each HEMS-GW 60 connected to each piece of EVSE 40, information representing a state (for example, information indicating whether or not the vehicle is being charged, a schedule for charging, and a condition for charging) of each piece of EVSE 40 under the control thereof and stores the information. As a result of accumulation of such data, a history of charging and a history of backfeeding of each piece of EVSE 40 under the control are stored in server 30.

A user can transmit information representing a state and a schedule of the user to data center 70 by operating portable terminal 80. Exemplary information representing a state of the user includes information indicating whether or not the user is in a condition of being ready for addressing DR. Exemplary information representing the schedule of the user includes time of departure of a POV from home or a drive plan of a MaaS vehicle. Data center 70 stores the information received from portable terminal 80 as being distinguished for each terminal ID. Server 30 can obtain information on the user from data center 70.

When server 30 receives the previously-described inquiry from server 20, server 30 calculates the DR capacity of a child AG corresponding thereto based on information on each of EV 50, EVSE 40, and the user described above, and transmits the DR capacity to server 20. When server 20 receives the previously-described first DR execution instruction from server 10, server 20 determines a DR amount for each child AG (that is, an amount of electric power of which adjustment is asked to the child AG) based on the DR capacity received from each server 30 included in lower aggregator E3 and transmits a signal (which is also referred to as a "second DR execution instruction" below) that instructs server 30 of each child AG to execute DR. The second DR execution instruction includes a region of interest of DR, a type of DR (for example, DR suppression or DR increase), an amount of DR for the child AG, and a DR period.

When server 30 receives the second DR execution instruction, it allocates the DR amount to each EV 50 that can address DR among EVs 50 under the control thereof, generates a DR signal for each EV 50, and transmits the DR signal to each EV 50. The DR signal includes a type of DR (for example, DR suppression or DR increase), an amount of DR for EV 50, and a DR period. A DR amount in DR increase requested to EV 50 during the DR period may be, for example, charging power during the DR period or an amount of charging during the DR period (that is, a time integrated value of charging power). A DR amount in DR suppression requested to EV 50 during the DR period may be, for example, an amount of discharging during the DR period (that is, a time integrated value of discharging power) or a guard value for restriction of charging power (an upper limit value of charging power) during the DR period.

When the user of each EV 50 included in VGI system 1 receives the DR signal, the user can contribute to adjustment of an amount of power demand by performing charging or discharging in accordance with DR by using a charging facility (that is, any of a plurality of pieces of EVSE 40 included in VGI system 1) managed by electric power utility company E1 which is the contracted utility. Then, the user who has contributed to adjustment of the amount of power demand has the right to receive a reward (compensation for contribution) from electric power utility company E1 based on the contract with electric power utility company E1 described previously.

Figure 3:
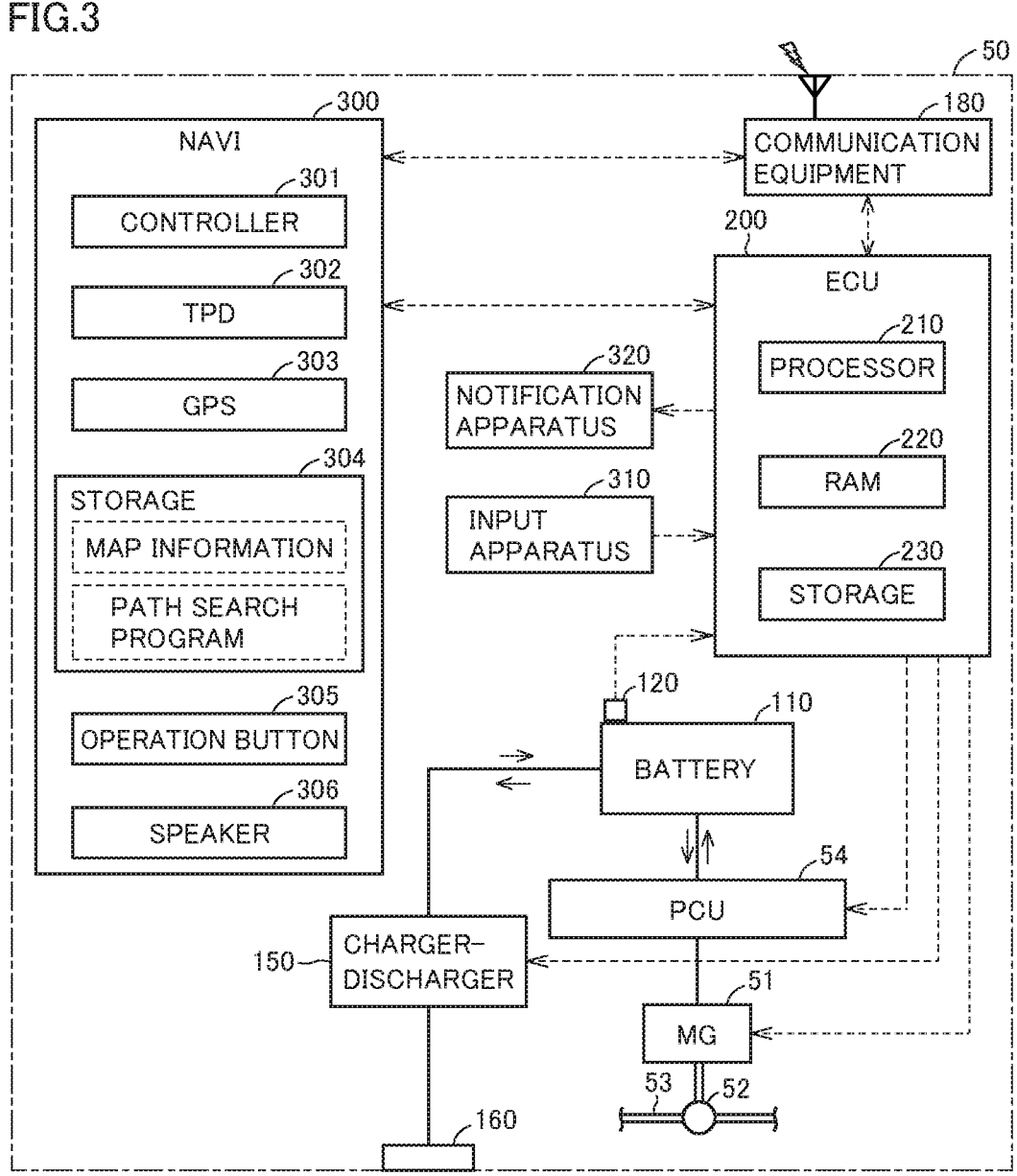
FIG. 3 is a diagram showing a configuration of an EV shown in FIG. 1.

FIG. 3 is a diagram showing a configuration of EV 50. Referring to FIG. 3, EV 50 includes a motor generator (which is referred to as an "MG" below) 51, a motive power transmission gear 52, a driveshaft 53, a power control unit (which is referred to as a "PCU" below) 54, a battery 110, a monitoring unit 120, a charger-discharger 150, an inlet 160, communication equipment 180, an electronic control unit (which is referred to as an "ECU" below) 200, a car navigation system (which is also referred to as a "NAVI system" below) 300, an input apparatus 310, and a notification apparatus 320. ECU 200 controls charging and discharging of battery 100. EV 50, battery 110, charger-discharger 150, and ECU 200 according to this embodiment correspond to an exemplary "vehicle", an exemplary "power storage," an exemplary "power feeder," and an exemplary "controller" according to the present disclosure, respectively.

Battery 110 stores electric power for traveling. Battery 110 includes, for example, a secondary battery such as a lithium ion battery or a nickel metal hydride battery. The secondary battery may be a cell or a battery assembly. Instead of the secondary battery, another power storage such as an electric double layer capacitor may be adopted.

Inlet 160 receives electric power supplied from the outside of EV 50. Charger-discharger 150 is located between inlet 160 and battery 110. Charger-discharger 150 includes a relay that switches between connection and disconnection of an electric power path from inlet 160 to battery 110 and a power conversion circuit (for example, a bidirectional converter) (neither of which is shown). Each of the relay and the power conversion circuit included in charger-discharger 150 is controlled by ECU 200.

A connector of a charging cable can be connected to inlet 160. As EVSE 40 outside EV 50 and inlet 160 are connected to each other through the charging cable, electric power can be supplied and received between EVSE 40 and EV 50. For example, electric power can be supplied from the outside of EV 50 to charge battery 110 of EV 50 (which is also referred to as "external charging" below). Electric power for external charging is supplied, for example, from EVSE 40 through the charging cable to inlet 160. Charger-discharger 150 converts electric power received at inlet 160 into electric power suitable for charging of battery 110 and outputs resultant electric power to battery 110. As EVSE 40 and inlet 160 are connected to each other through the charging cable, electric power can be fed (and battery 110 can be discharged) from EV 50 through the charging cable to EVSE 40. Electric power for power feed to the outside of EV 50 (which is also referred to as "external power feed" below) is supplied from battery 110 to charger-discharger 150. Charger-discharger 150 converts electric power supplied from battery 110 into electric power suitable for external power feed and outputs resultant electric power to inlet 160. When any of external charging and external power feed is performed, the relay of charger-discharger 150 is closed (connected), and when neither of external charging and external power feed is performed, the relay of charger-discharger 150 is opened (disconnected).

Charger-discharger 150 and inlet 160 may be a charger-discharger and an inlet adapted to the AC type or may be a charger-discharger and an inlet adapted to the DC type. EV 50 may include a plurality of types of chargers-dischargers and inlets so as to adapt to a plurality of types (for example, both of the AC type and the DC type).

The configuration of charger-discharger 150 is not limited as above and can be modified as appropriate. Charger-discharger 150 may include at least one of a rectification circuit, a power factor correction circuit, an insulating circuit (for example, an insulating transformer), an inverter, and a filter circuit.

MG 51 is implemented, for example, by a three-phase AC motor generator. MG 51 is driven by PCU 54 and generates driving force for traveling of EV 50. PCU 54 includes, for example, a controller including a processor, an inverter, and a converter (none of which is shown). The controller of PCU 54 receives an instruction (a control signal) from ECU 200 and controls the inverter and the converter of PCU 54 in accordance with the instruction. PCU 54 further includes a not-shown system main relay (which is referred to as an "SMR" below). The SMR switches between connection and disconnection of an electric power path from battery 110 to PCU 54. A state of the SMR (connection and disconnection) is controlled by ECU 200. The SMR is closed (connected) when the vehicle travels.

MG 51 is mechanically connected to driveshaft 53 with motive power transmission gear 52 serving as a reduction gear being interposed. Drive wheels (not shown) of EV 50 are attached to respective opposing ends of driveshaft 53 and rotate integrally with driveshaft 53. MG 51 is driven by electric power supplied from battery 110 through the inverter and the converter of PCU 54 and enters a power running state. MG 51 in the power running state rotates driveshaft 53 (and the drive wheels of EV 50). MG 51 performs regeneration and supplies regenerated electric power to battery 110. EV 50 may be of any drive type, and for example, the EV may be a front-wheel-drive vehicle or a four-wheel-drive vehicle. Though FIG. 3 shows a configuration in which only a single MG is provided, the number of MGs is not limited as such and a plurality of (for example, two) MGs may be provided.

Monitoring unit 120 includes various sensors that detect a state (for example, a temperature, a current, and a voltage) of battery 110 and outputs a result of detection to ECU 200. ECU 200 can obtain a state (for example, a temperature, a current, a voltage, a state of charge (SOC), and an internal resistance) of battery 110 based on an output (that is, detection values from various sensors) from monitoring unit 120. The SOC represents a remaining amount of stored power, and it is expressed, for example, as a ratio of a current amount of stored power to an amount of stored power in a fully charged state that ranges from 0 to 100%.

Communication equipment 180 includes a communication interface (I/F) for communication with each of server 30, EVSE 40, and portable terminal 80. Communication equipment 180 is registered in server 30. Communication equipment 180 may further include a communication I/F for communication with each of HEMS-GW 60 and data center 70.

ECU 200 includes a processor 210, a random access memory (RAM) 220, and a storage 230. For example, a central processing unit (CPU) can be adopted as processor 210. RAM 220 functions as a work memory that temporarily stores data to be processed by processor 210. Storage 230 can store information that is put thereinto. Storage 230 includes, for example, a read only memory (ROM) and a rewritable non-volatile memory. Storage 230 stores not only a program but also information (for example, a map, a mathematical expression, and various parameters) to be used by a program. ECU 200 communicates with equipment (for example, server 30, EVSE 40, and portable terminal 80) outside EV 50 through communication equipment 180. Any number of processors may be provided in ECU 200 and a processor may be prepared for each prescribed type of control.

NAVI system 300 includes a controller 301, a touch panel display (which is also referred to as a "TPD" below) 302, a global positioning system (GPS) module 303, a storage 304, an operation button 305, and a speaker 306. Controller 301 includes a processor and a RAM (neither of which is shown). For example, at least one of a hard disk drive and a solid state drive (SSD) can be adopted as storage 304. Storage 304 stores map information and a path search program. In this embodiment, a smart speaker (that is, a speaker with an interactive and voice-activated artificial intelligence (AI) assistant function) is adopted as speaker 306. Without being limited as such, a general speaker that does not accept audio input may be adopted instead of the smart speaker.

TPD 302 accepts a touch input from a user or shows a map and other types of information. Speaker 306 accepts an audio input from a user or outputs sound (including voice). Operation button 305 also accepts an input from a user. Each of TPD 302, speaker 306, and operation button 305 functions as an input apparatus and outputs a signal corresponding to an input from the user to controller 301. Each of TPD 302 and speaker 306 functions as a notification apparatus and gives a notification to the user (for example, a driver and/or a passenger of EV 50).

GPS module 303 receives a signal (which is referred to as a "GPS signal" below) from a GPS satellite (not shown). Controller 301 identifies a position of EV 50 based on the GPS signal. By controlling TPD 302, controller 301 shows in real time a position of EV 50 on a map shown on TPD 302. Controller 301 searches for a path for finding an optimal route (for example, the shortest route) from the current position of EV 50 to a destination by executing a path search program, and shows the optimal route found by path search on the map shown on TPD 302. The user can set a destination in controller 301 through the input apparatus (that is, TPD 302, speaker 306, and operation button 305) described above.

Input apparatus 310 is mounted on EV 50 separately from an input apparatus of NAVI system 300. Input apparatus 310 accepts an input from a user and outputs a signal corresponding to the input from the user to ECU 200. Communication between ECU 200 and input apparatus 310 may be wired or wireless. Examples of input apparatus 310 include various switches, various pointing devices, a keyboard, a smart speaker, and a touch panel.

Notification apparatus 320 is mounted on EV 50 separately from a notification apparatus of NAVI system 300. Notification apparatus 320 performs prescribed processing for giving a notification to a user (for example, a driver and/or a passenger of EV 50) when a request is given from ECU 200. Any of a display apparatus (for example, a touch panel display), a speaker (for example, a smart speaker), and a lamp (for example, a malfunction indicator lamp (MIL)) may be adopted as notification apparatus 320.

Figure 4:
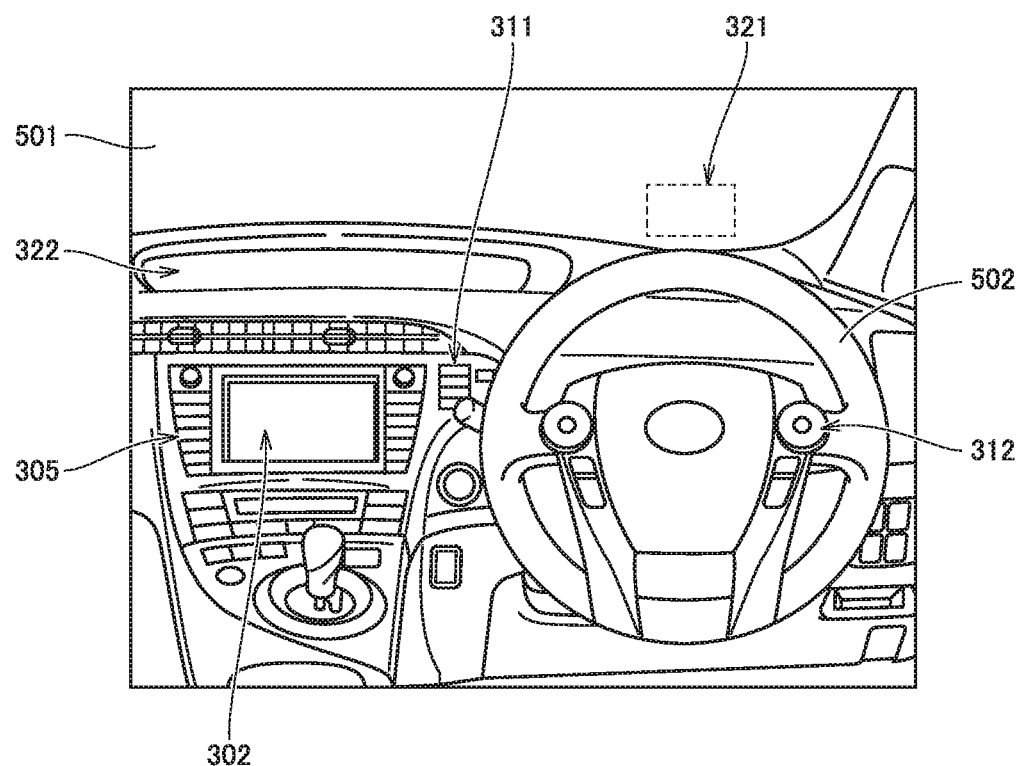
FIG. 4 is a diagram showing an input apparatus and a notification apparatus mounted in the vicinity of a driver's seat of the EV shown in FIG. 3.

FIG. 4 is a diagram showing the input apparatus and the notification apparatus mounted in the vicinity of a driver's seat of EV 50. Referring to FIG. 4, EV 50 includes operation buttons 311 and 312, a head-up display (which is referred to as a "HUD" below) 321, and a meter panel 322. Operation buttons 311 and 312 are included in input apparatus 310 (FIG. 3) described previously. Operation button 311 is provided in an instrumental panel of EV 50. Operation button 312 is provided in a steering wheel 502 of EV 50. Each of HUD 321 and meter panel 322 is included in notification apparatus 320 (FIG. 3) described previously. HUD 321 is a display provided in a windshield 501 of EV 50. Meter panel 322 is located in the vicinity of windshield 501 and shows information on EV 50 (for example, a remaining capacity of the battery (SOC), a traveling speed, a travel distance, average specific power consumption, and an outdoor temperature). TPD 302 and operation button 305 of NAVI system 300 (FIG. 3) are provided in the instrument panel of EV 50. A main body of NAVI system 300 is arranged in the instrument panel.

Figure 5:
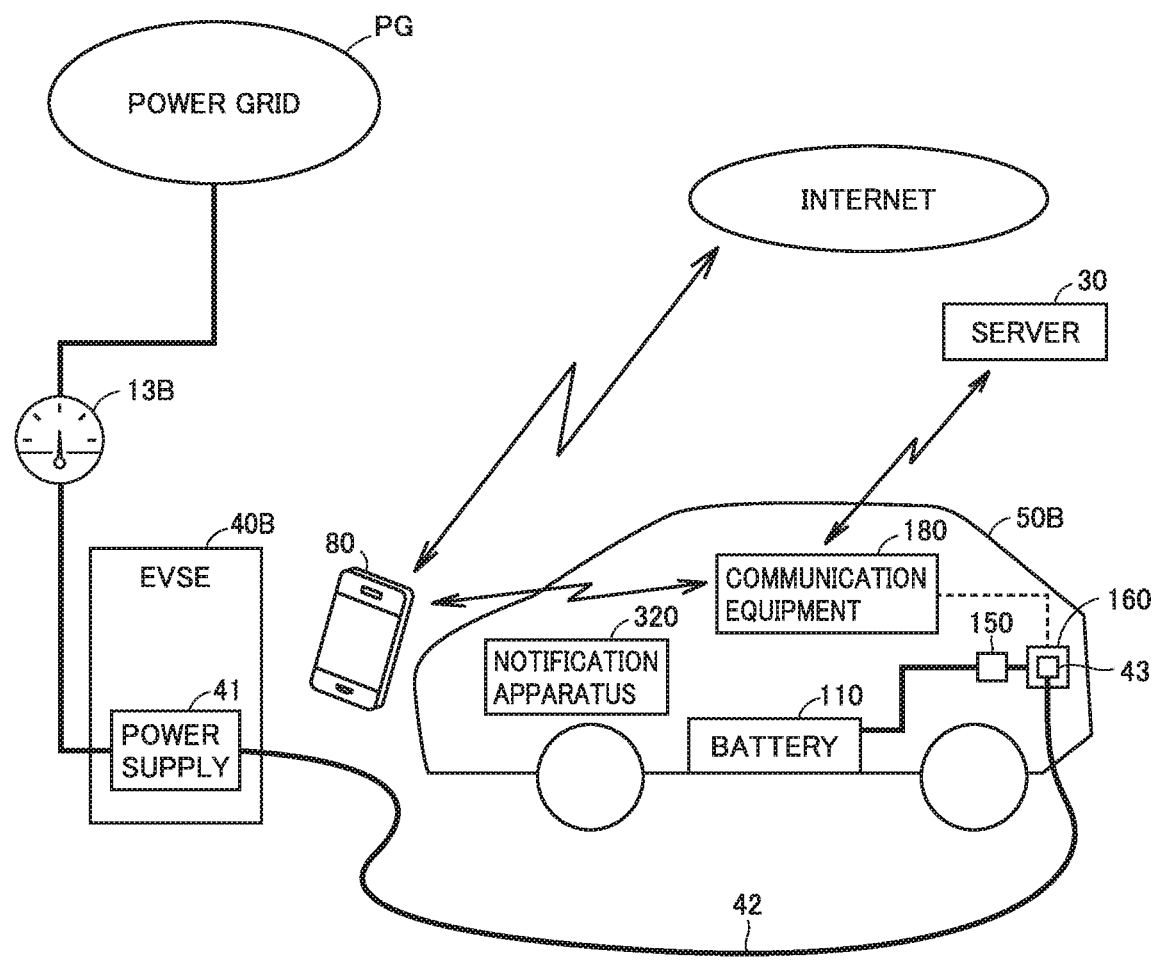
FIG. 5 is a diagram for illustrating the EV connected to public EVSE in the VGI system shown in FIG. 1.

FIG. 5 is a diagram for illustrating EV 50B connected to public EVSE 40B. Referring to FIG. 5, EV 50B is electrically connected to EVSE 40B through a charging cable 42 while it is parked in a parking lot where EVSE 40B is installed. Charging cable 42 includes a connector 43 at its tip end. As connector 43 of charging cable 42 connected to EVSE 40B is connected to inlet 160 of EV 50B, communication between EV 50B and EVSE 40B can be established and electric power can be supplied from a power supply 41 (that is, a power supply provided outside EV 50B) included in EVSE 40B to EV 50B (and battery 110). Power supply 41 is connected to a power grid PG provided by electric power utility company E1 (FIG. 1) with smart meter 13B being interposed. Power supply 41 supplies electric power supplied from power grid PG to EV 50B through charging cable 42. An amount of power usage in EVSE 40B is measured by smart meter 13B.

Communication equipment 180 mounted on EV 50B communicates with EVSE 40B through charging cable 42. Communication equipment 180 wirelessly communicates with server 30, for example, through a mobile communication network. In this embodiment, communication equipment 180 and portable terminal 80 wirelessly communicate with each other. Communication equipment 180 and portable terminal 80 may communicate with each other through short-range communication (for example, direct communication in a vehicle or within an area around the vehicle). Though server 30 and EVSE 40B do not communicate with each other in this embodiment, however, server 30 and EVSE 40B may be able to communicate with each other. At least one of communication equipment 180 and portable terminal 80 receives an amount of power usage in EVSE 40B from smart meter 13B. At least one of notification apparatus 320 and portable terminal 80 may show at least one of a value measured by smart meter 13B, a DR amount allocated to EV 50B, and a rate of achievement of the DR amount during charging or discharging of battery 110.

Under the current circumstances, no service is available for providing a user with information that indicates an electric utility that manages a public facility (for example, EVSE 40B) and it is difficult for the user to identify a public facility managed by a contracted utility. ECU 200 according to this embodiment facilitates identification of a charging facility managed by the contracted utility, by being configured as will be described below.

Figure 6:
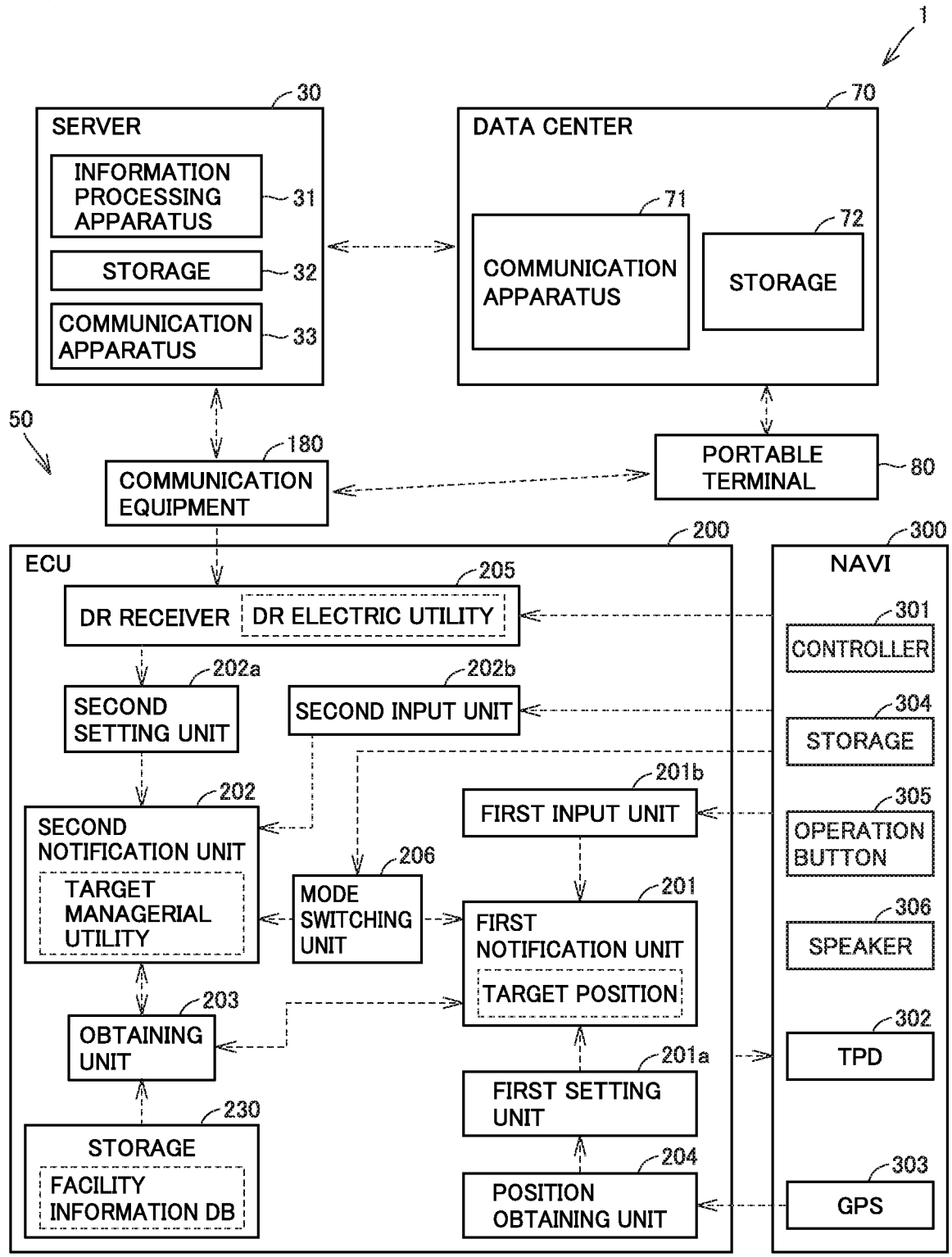
FIG. 6 is a diagram showing for each function, a component of a controller of a vehicle according to the first embodiment of the present disclosure.

FIG. 6 is a diagram showing a component of ECU 200 for each function. Referring to FIG. 6 together with FIG. 3, ECU 200 includes a first notification unit 201, a first setting unit 201*a*, a first input unit 201*b*, a second notification unit 202, a second setting unit 202*a*, a second input unit 202*b*, an obtaining unit 203, a position obtaining unit 204, a DR receiver 205, and a mode switching unit 206 which will be described below. In ECU 200 according to this embodiment, each component above is implemented by processor 210 and a program executed by processor 210. Without being limited as such, each component may be implemented by dedicated hardware (electronic circuitry).

Storage 230 contains a facility information database (which is also referred to as a "facility information DB" below), in which, for a plurality of charging facilities, position information that indicates a position of each charging facility and utility information that indicates an electric utility that manages each charging facility are databased in association with each other. In this embodiment, the facility information DB stored in storage 230 includes data on a plurality of charging facilities (that is, EVSE 40 included in VGI system 1) managed by electric power utility company E1 and data on a plurality of charging facilities managed by an electric utility other than electric power utility company E1. The facility information DB may include data only on a public charging facility. The facility information DB may further include data on a non-public charging facility in addition to data on the public charging facility.

FIG. 7 is a diagram showing an exemplary facility information DB. In FIG. 7, each of an "electric power utility company X1" and an "electric power utility company X2" represents an electric power utility company different from electric power utility company E1 shown in FIG. 1.

Referring to FIG. 7, this facility information DB includes facility information for each of the plurality of charging facilities. Facility information on each charging facility included in the facility information DB includes position information that indicates a position of the charging facility, utility information that indicates an electric utility (a managerial utility) that manages the charging facility, type information that indicates a charging type of the charging facility, and backfeeding information that indicates whether or not the charging facility is adapted to backfeeding, in association with one another. In the facility information DB shown in FIG. 7, facility information for each charging facility is distinguished based on a facility ID. Hereinafter, a charging facility identified by a facility ID "E-ID1" will be referred to as an "ID1-charging facility." For example, facility information on the ID1-charging facility indicates a position coordinate of the ID1-charging facility and shows that electric power utility company E1 is the managerial utility of the ID1-charging facility, the charging type of the ID1-charging facility is the AC type, and the ID1-charging facility is adapted to backfeeding. Since the ID1-charging facility is managed by electric power utility company E1, it corresponds to EVSE 40 included in VGI system 1 (FIG. 1). Hereinafter, a charging facility identified by a facility ID "E-ID52" will be referred to as an "ID52-charging facility." Facility information on the ID52-charging facility indicates a position coordinate of the ID52-charging facility, and shows that electric power utility company X2 is the managerial utility of the ID52-charging facility, the charging type of the ID52-charging facility is the DC type, and the ID52-charging facility is not adapted to backfeeding. The ID52-charging facility is not included in VGI system 1 (FIG. 1).

Referring again to FIG. 6, obtaining unit 203 selectively obtains facility information on a charging facility or a plurality of charging facilities that satisfies/satisfy a prescribed requirement from among pieces of facility information included in the facility information DB.

Obtaining unit 203 obtains facility information on a charging facility (that is, a first target facility) located at a prescribed target position from the facility information DB, for example, in response to a request from first notification unit 201. Obtaining unit 203 selectively obtains facility information identified by a facility ID of a charging facility of which position indicated by position information corresponds to the target position, for example, from among pieces of facility information contained in the facility information DB shown in FIG. 7. The target position may be expressed by a position coordinate (for example, a latitude and a longitude) or a region. First notification unit 201 causes a prescribed notification apparatus (in this embodiment, TPD 302 of NAVI system 300) to give first information that indicates the electric utility that manages the first target facility, the third information that indicates the charging type of the first target facility, and the fourth information that indicates whether or not the first target facility is adapted to backfeeding, by using facility information obtained by obtaining unit 203. First notification unit 201 may cause notification apparatus 320 (FIG. 3) or portable terminal 80 instead of NAVI system 300 to give the first information, the third information, and the fourth information.

Position obtaining unit 204 obtains a position of EV 50. In this embodiment, position obtaining unit 204 obtains a GPS signal (that is, a signal that indicates a position of EV 50) from GPS module 303 in NAVI system 300. First setting unit 201a sets an area around EV 50 as the target position in first notification unit 201, based on the position of EV 50 obtained by position obtaining unit 204 (in this embodiment, a GPS signal). First setting unit 201a is in an on state in a nearby area mode which will be described later and it is in an off state in another notification mode.

First input unit 201b accepts an input of the target position by a user. First input unit 201b is in an on state in a user input mode which will be described later and it is in an off state in another notification mode. In the user input mode, when the user inputs the target position to first input unit 201b through NAVI system 300 (for example, TPD 302, operation button 305, or speaker 306), the target position input by the user is set in first notification unit 201 by first input unit 201b. The user may input a target position to first input unit 201b through input apparatus 310 (FIG. 3) or portable terminal 80 instead of NAVI system 300.

Obtaining unit 203 obtains facility information on a charging facility (that is, a second target facility) managed by a prescribed electric utility from the facility information DB, for example, in response to a request from second notification unit 202. The prescribed electric utility corresponds to a managerial utility of the second target facility (that is, a target managerial utility). Obtaining unit 203 selectively obtains facility information identified by a facility ID corresponding to utility information indicating the target managerial utility (for example, electric power utility company E1), for example, from among pieces of facility information contained in the facility information DB shown in FIG. 7. Second notification unit 202 causes a prescribed notification apparatus (in this embodiment, TPD 302 of NAVI system 300) to give the second information that indicates a position of a second target facility (for example, EVSE 40 managed by electric power utility company E1). Second notification unit 202 may cause notification apparatus 320 (FIG. 3) or portable terminal 80 instead of NAVI system 300 to give the second information.

DR receiver 205 receives from server 30 through communication equipment 180, a demand response (DR) signal that represents a content (for example, a type of DR, an amount of DR for EV 50, and a DR period) of DR requested by a DR electric utility (a designated electric utility). In this embodiment, NAVI system 300 accepts an input of a DR electric utility by a user. The user can set the DR electric utility in DR receiver 205 through NAVI system 300 (for example, TPD 302, operation button 305, or speaker 306). NAVI system 300 according to this embodiment corresponds to an exemplary "third input unit." In this embodiment, electric power utility company E1 is set as the DR electric utility in DR receiver 205. In this embodiment, the DR electric utility matches with the contracted utility. The user may set the DR electric utility in DR receiver 205 through input apparatus 310 (FIG. 3) or portable terminal 80 instead of NAVI system 300.

When a DR participation request that requests participation in DR is given from server 10 to each server 20 in VGI system 1 shown in FIG. 1, each server 20 transmits an adjustable DR amount to server 10. Server 10 that has received the adjustable DR amount determines a parent AG that will participate in DR and transmits a first DR execution instruction to server 20 of each parent AG that will participate in DR. Each server 20 that has received the first DR execution instruction determines a child AG that will participate in DR and transmits a second DR execution instruction to server 30 of each child AG that will participate in DR. Each server 30 that has received the second DR execution instruction determines EV 50 that will participate in DR and transmits a DR signal to each EV 50 that will participate in DR. DR receiver 205 receives this DR signal. DR may immediately be started when DR receiver 205 receives the DR signal or may be started at timing after reception of the DR signal by DR receiver 205. DR start timing is indicated by a DR period included in the DR signal.

When DR start timing indicated by the DR signal received by DR receiver 205 will come within a prescribed time period from the current time, second setting unit 202a sets electric power utility company E1 that has requested DR as the target managerial utility in second notification unit 202. Second setting unit 202a is in an on state in a DR mode which will be described later and is in an off state in another notification mode.

Second input unit 202b accepts an input of a target managerial utility from the user. Second input unit 202b is in an on state in the user input mode which will be described later and is in an off state in another notification mode. In the user input mode, when the user inputs a target managerial utility to second input unit 202b through NAVI system 300 (for example, TPD 302, operation button 305, or speaker 306), the target managerial utility input by the user is set in second notification unit 202 by second input unit 202b. The user may input the target managerial utility into second input unit 202b through input apparatus 310 (FIG. 3) or portable terminal 80 instead of NAVI system 300.

In this embodiment, ECU 200 gives a notification to the user in a plurality of types of notification modes. The mode of notification by ECU 200 includes the nearby area mode, the DR mode, and the user input mode. Mode switching unit 206 switches among the notification modes based on an input from the user. When the user instructs mode switching unit 206 to switch among the notification modes through NAVI system 300 (for example, TPD 302, operation button 305, or speaker 306), mode switching unit 206 switches among the notification modes of ECU 200 in accordance with the instruction from the user. The user can select a desired notification mode (any of the nearby area mode, the DR mode, and the user input mode in this embodiment) through NAVI system 300 and mode switching unit 206. The user may instruct mode switching unit 206 to switch among the notification modes through input apparatus 310 (FIG. 3) or portable terminal 80 instead of NAVI system 300.

Server 30 includes an information processing apparatus 31, a storage 32, and a communication apparatus 33. For example, at least one of a hard disk drive and a solid state drive (SSD) can be adopted as storage 32. Information on each of EVSE 40, EV 50, and HEMS-GW 60 (FIG. 2) registered in server 30 is stored in storage 32. In storage, information on EV 50 is associated with a vehicle ID and information on EVSE 40 is associated with a facility ID. Communication apparatus 33 includes a communication I/F for communication with each of HEMS-GW 60, data center 70, and communication equipment 180. Communication apparatus 33 may further include a communication I/F for communication with portable terminal 80. Communication apparatus 33 transmits a DR signal that represents a content of demand response (DR) requested by a DR electric utility (electric power utility company E1 in this embodiment) to communication equipment 180 of EV 50.

Data center 70 includes a communication apparatus 71 and a storage 72. Communication apparatus 71 can communicate with each of server 30, HEMS-GW 60 (FIG. 2), and portable terminal 80. Communication apparatus 71 may further be able to communicate with communication equipment 180. Communication apparatus 71 has storage 72 store data received from the outside and transmits data read from storage 72 to the outside. Storage 72 stores information on each of portable terminal 80 and a user registered in server 30 in association with a terminal ID. Storage 72 may further store a map database.

Figure 8:
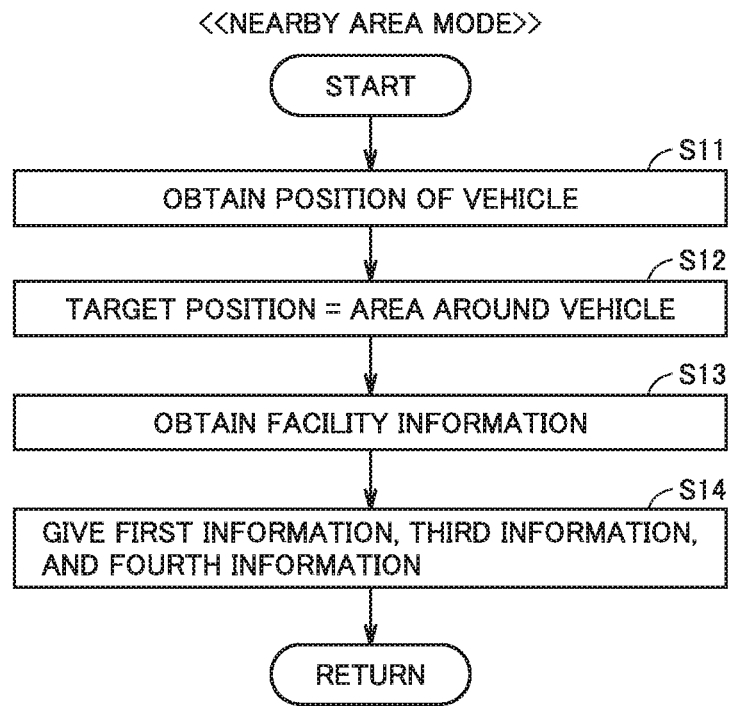
FIG. 8 is a flowchart showing processing performed in a nearby area mode by the controller of the vehicle according to the first embodiment of the present disclosure.

FIG. 8 is a flowchart showing processing performed by ECU 200 in the nearby area mode. Processing shown in this flowchart is repeatedly performed while the notification mode of ECU 200 is set to the nearby area mode.

Referring to FIG. 8 together with FIG. 6, in step (which is also simply denoted as "S" below) 11, position obtaining unit 204 obtains information (for example, a GPS signal) indicating a current position of EV 50. In S12, first setting unit 201*a* sets an area around EV 50 (for example, a range within a prescribed distance from the current position of EV 50 indicated by the GPS signal) in first notification unit 201. The area around EV 50 is thus set as the target position of first notification unit 201. In S13, first notification unit 201 requests obtaining unit 203 to obtain facility information on a charging facility located at the target position (that is, the area around EV 50). Hereinafter, the facility information on a charging facility located in the area around EV 50 will be referred to as "nearby area facility information." Then, obtaining unit 203 obtains nearby area facility information from the facility information DB in response to the request from first notification unit 201. In S14, first notification unit 201 receives the nearby area facility information from obtaining unit 203 and causes TPD 302 of NAVI system 300 to give the first information, the third information, and the fourth information described previously by using the nearby area facility information.

Figure 9:
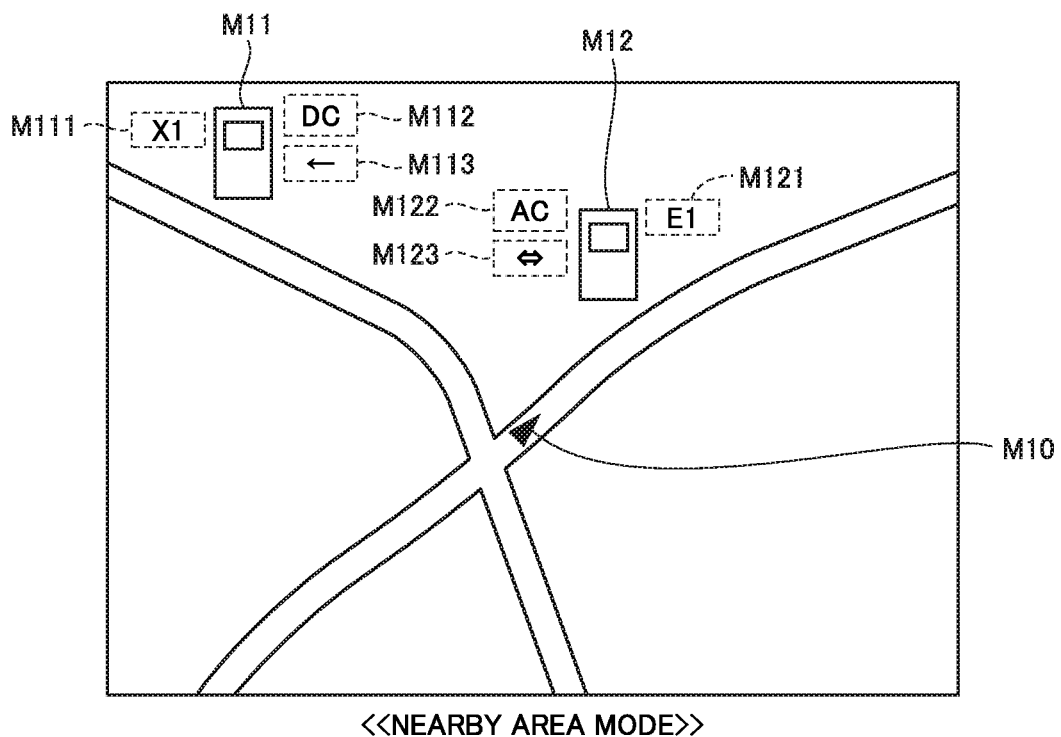
FIG. 9 is a diagram showing an exemplary notification screen shown in the processing in FIG. 8.

FIG. 9 is a diagram showing an exemplary screen shown on TPD 302 in S14 in FIG. 8. Referring to FIG. 9, in this example, TPD 302 shows a map of the area around EV 50 (target position) and shows the first information, the third information, and the fourth information on the map. The screen shown in FIG. 9 (which is also referred to as a "first notification screen" below) includes a mark M10, images M11 and M12, characters M111, M112, M121, and M122, and signs M113 and M123. Mark M10 indicates a position of EV 50 on the map. Image M11 shows a position of one charging facility (which is also referred to as an "M11-charging facility" below) located in the area around EV 50 (target position). Character M111 indicates that electric power utility company X1 is the electric utility that manages the M11-charging facility (that is, the first information). Character M112 indicates that the charging type of the M11-charging facility is the DC type (that is, the third information). Sign M113 indicates that the M11-charging facility is not adapted to backfeeding (that is, the fourth information). Image M12 shows a position of another charging facility (which is also referred to as an "M12-charging facility" below) located in the area around EV 50 (target position). Character M121 indicates that electric power utility company E1 is the electric utility that manages the M12-charging facility (that is, the first information). Character M122 indicates that the charging type of the M12-charging facility is the AC type (that is, the third information). Sign M123 indicates that the M12-charging facility is adapted to backfeeding (that is, the fourth information). The first notification screen thus gives the first information, the third information, and the fourth information.

According to the first notification screen, the user can recognize the charging type of the charging facility based on the third information. The user can determine whether or not the charging type of the charging facility is in conformity with the charging type of EV 50 based on the third information. The third information indicates all charging types to which the charging facility is adapted. The third information on the charging facility adapted to a plurality of charging types indicates the plurality of charging types. In this embodiment, the charging type of the charging facility is categorized into two types of the alternating-current (AC) type and the direct-current (DC) type. Without being limited as such, the charging type of the charging facility may be categorized in any manner and the charging type may be subcategorized. Exemplary subcategories include an AC-100V receptacle type, an AC-200V receptacle type, AC-100V charging cable attachment, AC-200V charging cable attachment, a DC-CHAdeMO type, a DC-combined charging type (CCS), and a DC-GB/T type.

According to the first notification screen, the user can recognize whether or not the charging facility is adapted to backfeeding based on the fourth information. For example, when the user is requested by the electric utility to participate in DR suppression, the user can identify a charging and discharging facility managed by the electric utility based on the first information and the fourth information, and have battery 110 discharge (that is, backfeeding) to the identified charging and discharging facility.

Any method of giving the first information, the third information, and the fourth information is applicable, and limitation to the method described above is not intended. Each of the first information, the third information, and the fourth information may be represented by any of a character, a graphics, a number, a color, an image (for example, an icon), or combination thereof. A notification may be given through voice and sound rather than by representation. For example, when the user touches image M11 on the screen, speaker 306 of NAVI system 300 may give information on the M11-charging facility by voice. Though the first notification screen gives the first information, the third information, and the fourth information, it is not essential that the third information and the fourth information are given in S14 in FIG. 8. Only the first information may be given in S14 in FIG. 8.

As set forth above, in the nearby area mode, first setting unit 201*a* sets the area around EV 50 as the target position in first notification unit 201 based on the position of EV 50 (S12 in FIG. 8). The user can recognize the electric utility that manages each charging facility located in the area around EV 50 based on the first information given by first notification unit 201 (see, for example, characters M111 and M121 in FIG. 9). For example, when the user is requested by the contracted utility to participate in DR while EV 50 is traveling, the user can search for a public facility managed by the contracted utility while the user drives EV 50. When a public facility managed by the contracted utility is found, the user can participate in DR by using that public facility.

Figure 10:
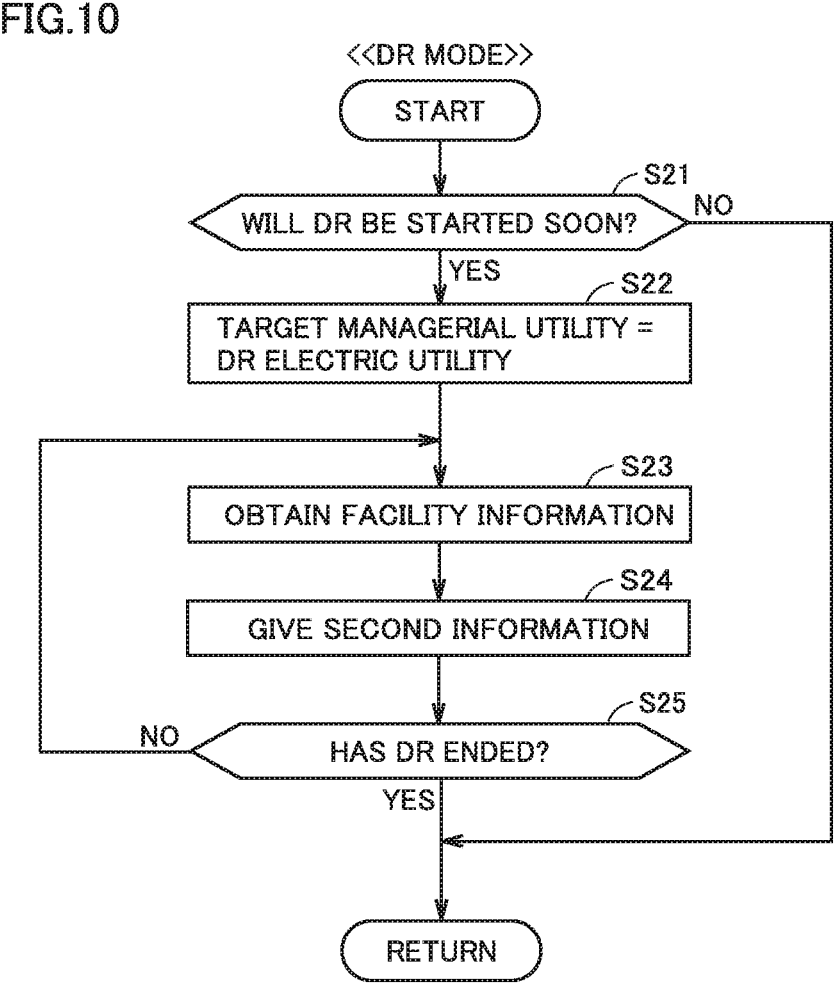
FIG. 10 is a flowchart showing processing performed in a DR mode by the controller of the vehicle according to the first embodiment of the present disclosure.

FIG. 10 is a flowchart showing processing performed by ECU 200 in the DR mode. Processing shown in this flowchart is repeatedly performed while the notification mode of ECU 200 is set to the DR mode.

Referring to FIG. 10 together with FIG. 6, in S21, second setting unit 202a determines whether or not the DR start timing indicated by the DR signal received by ECU 200 (more specifically, DR receiver 205) is close. In this embodiment, the DR signal received by DR receiver 205 represents a content of DR requested by electric power utility company E1. When the DR start timing will come within a prescribed time period from the current time, second setting unit 202a makes a determination as YES in S21, and when the DR start timing comes after lapse of the prescribed time period since the current time, it makes determination as NO in S21. The timing of reception of the DR signal by DR receiver 205 may be before the notification mode of ECU 200 is set to the DR mode or while the notification mode of ECU 200 is set to the DR mode. For example, when DR receiver 205 receives the DR signal indicating immediate start while the notification mode of ECU 200 is set to the DR mode, second setting unit 202a makes determination as YES in S21.

While the DR start timing is determined as not being close (NO) in S21, processing in S21 is repeatedly performed. When it is determined in S21 that the DR start timing is close (YES), the process proceeds to S22. In S22, second setting unit 202a sets the DR electric utility (that is, electric power utility company E1 that requests DR) in second notification unit 202. Electric power utility company E1 is thus set as the target managerial utility in second notification unit 202. EVSE 40 managed by electric power utility company E1 is set as the second target facility in second notification unit 202. In S23, second notification unit 202 requests obtaining unit 203 to obtain facility information on the second target facility (that is, EVSE 40 managed by electric power utility company E1). Hereinafter, the facility information on EVSE 40 managed by electric power utility company E1 will be referred to as "E1-managed facility information." Obtaining unit 203 then obtains the E1-managed facility information from the facility information DB in response to the request from second notification unit 202. In S24, second notification unit 202 receives the E1-managed facility information from obtaining unit 203 and causes TPD 302 of NAVI system 300 to give the previously-described second information by using the E1-managed facility information.

In S25, second notification unit 202 determines whether or not DR has ended. Second notification unit 202 repeats the processing in S23 and S24 until DR ends (that is, while determination as NO is made in S25). In this embodiment, the DR signal includes the DR period (that is, DR start time and DR end time). As the DR end time comes, DR ends. Without being limited as such, any condition for end of DR can be set. For example, DR may end when DR receiver 205 receives a DR cancellation signal. When DR ends (YES in S25), the process returns to S21.

Figure 11:
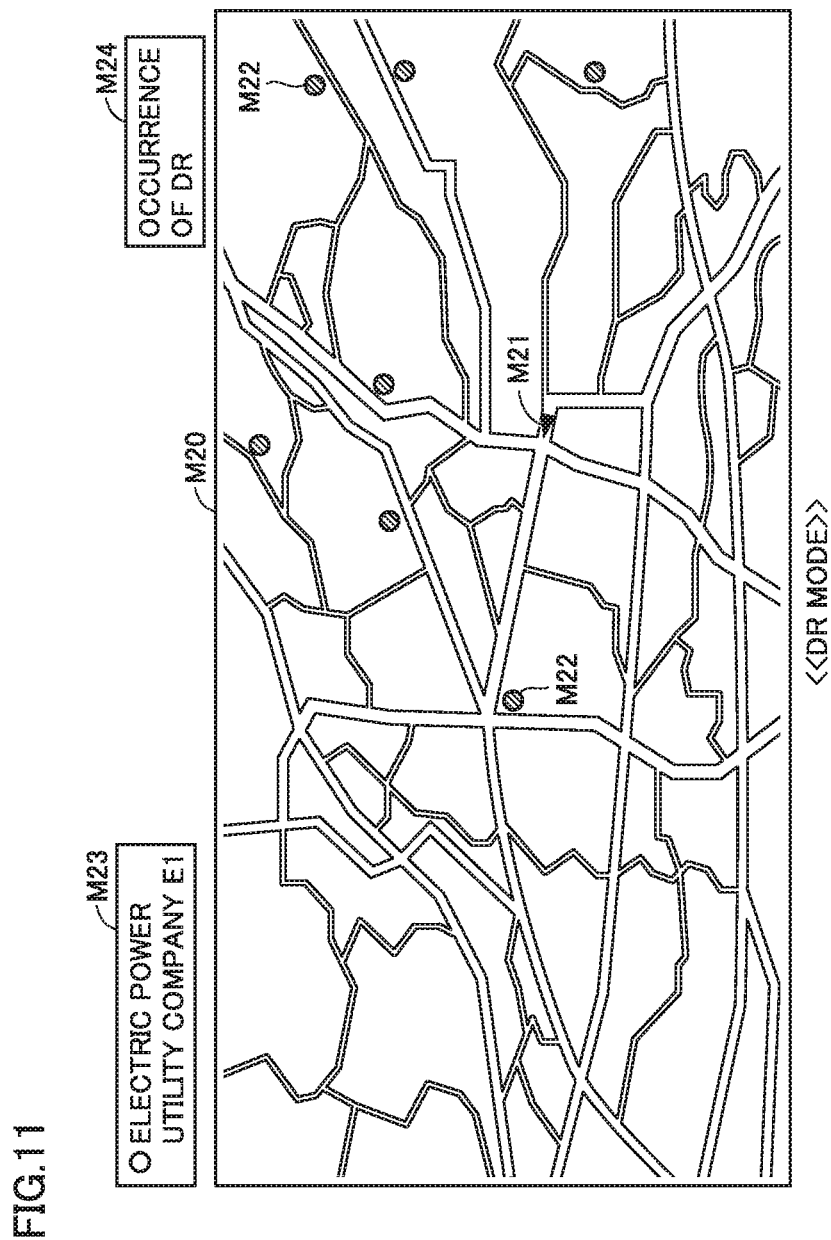
FIG. 11 is a diagram showing an exemplary notification screen shown in the processing in FIG. 10.

FIG. 11 is a diagram showing an exemplary screen shown on TPD 302 in S24 in FIG. 10. Referring to FIG. 11, in this example, TPD 302 shows a map in a display section M20 and shows the second information on the map shown in display section M20. The screen shown in FIG. 11 (which is also referred to as a "second notification screen" below) includes display sections M20, M23, and M24. Display section M20 includes a mark M21 indicating a position of EV 50 on the map and a mark M22 indicating a position of the second target facility on the map (that is, the second information). In this embodiment, EVSE 40 managed by electric power utility company E1 is defined as the second target facility. Display section M23 shows that electric power utility company E1 is set as the electric utility that manages the charging facility (that is, the charging facility indicated by mark M22) shown in display section M20. Display section M24 shows that DR will soon be started (or DR has already been started).

NAVI system 300 may change a map to be shown in display section M20. Though display section M20 shows a map of the area around EV 50 in the example in FIG. 11, a part of the map shown in display section M20 may be changed in response to an operation by a user (for example, a scrolling operation). Display section M20 may show a map of a region (for example, around a destination set in NAVI system 300) distant from the position of EV 50.

Though a notification about a position of a charging facility is given by showing a mark indicating a position of the charging facility on the map in the second notification screen, any method of giving a notification about the position of the charging facility is applicable, without being limited as above. A notification about the position of the charging facility may be given, for example, by giving a notification about a position coordinate of the charging facility or explaining positional relation between the charging facility and a prescribed landmark. A notification may be given through any of representation and voice and sound.

Though the second notification screen does not show the third information and the fourth information, the third information and the fourth information in addition to the second information may be given in S24 in FIG. 10. For example, as the user touches mark M22 (any of the plurality of marks M22) on the screen, the third information and the fourth information of the charging facility located at the position of touched mark M22 may be given (see, for example, FIG. 13 which will be described later).

As set forth above, in the DR mode, when the timing to start demand response (DR) requested by the DR electric utility (for example, electric power utility company E1) is close to the current time (YES in S21 in FIG. 10), second setting unit 202a sets the DR electric utility as the target managerial utility in second notification unit 202 (S22 in FIG. 10). Second notification unit 202 gives the second information that indicates the position of the charging facility managed by the DR electric utility (S24 in FIG. 10). The user can identify the charging facility (for example, the public facility) managed by the DR electric utility based on the second information (see FIG. 11) given by second notification unit 202 and participate in DR by using the identified charging facility.

Figure 12:
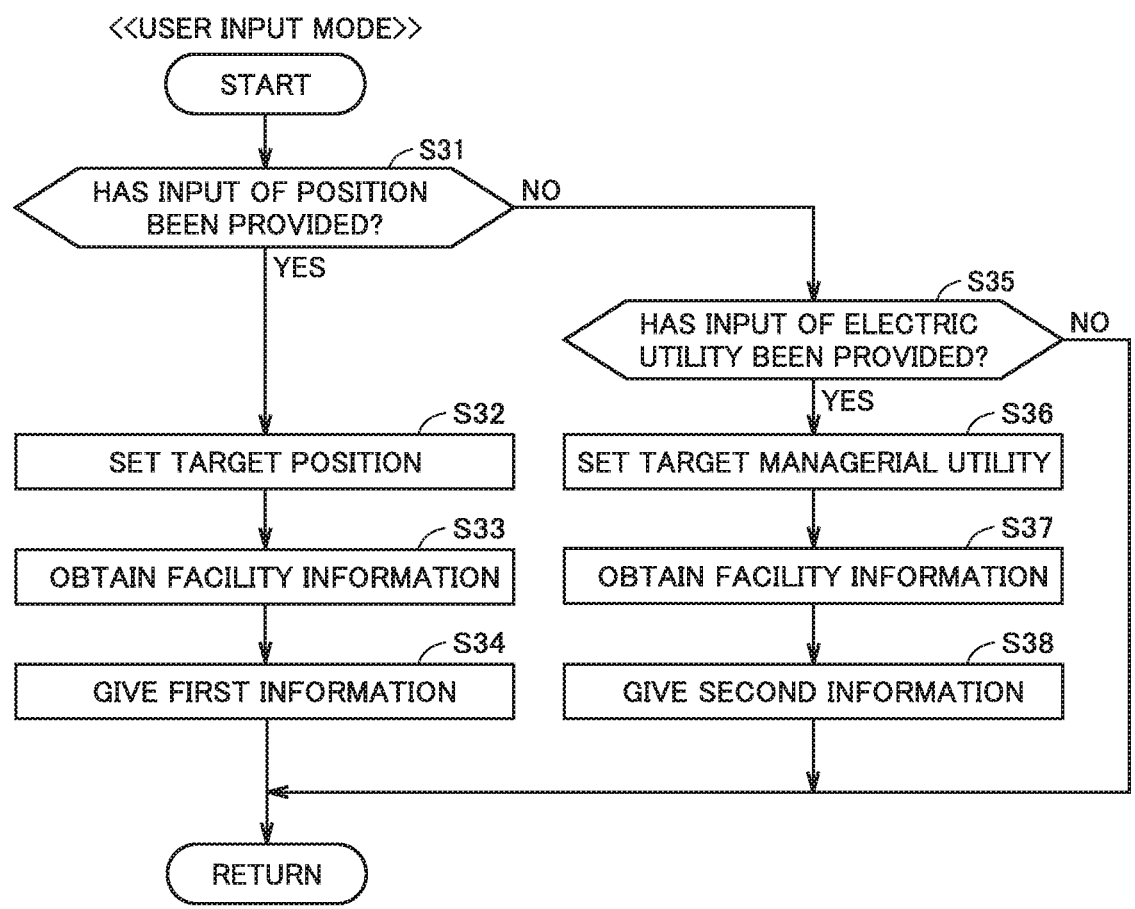
FIG. 12 is a flowchart showing processing performed in a user input mode by the controller of the vehicle according to the first embodiment of the present disclosure.

FIG. 12 is a flowchart showing processing performed by ECU 200 in the user input mode. Processing shown in this flowchart is repeatedly performed while the notification mode of ECU 200 is set to the user input mode.

Referring to FIG. 12 together with FIG. 6, in S31, first input unit 201b determines whether or not the user has provided an input of the target position to NAVI system 300 (for example, TPD 302, operation button 305, or speaker 306).

When the user has provided an input of the target position (YES in S31), in S32, the target position input by the user is set in first notification unit 201 by first input unit 201b. The target position in first notification unit 201 is thus updated and the charging facility located at the target position is set as the first target facility in first notification unit 201. In S33, first notification unit 201 requests obtaining unit 203 to obtain the facility information on the first target facility. Hereinafter, the facility information on the first target facility will be referred to as "first user facility information." Obtaining unit 203 then obtains the first user facility information from the facility information DB in response to the request from first notification unit 201. In S34, first notification unit 201 receives the first user facility information from obtaining unit 203 and causes TPD 302 of NAVI system 300 to give the previously-described first information by using the first user facility information.

Figure 13:
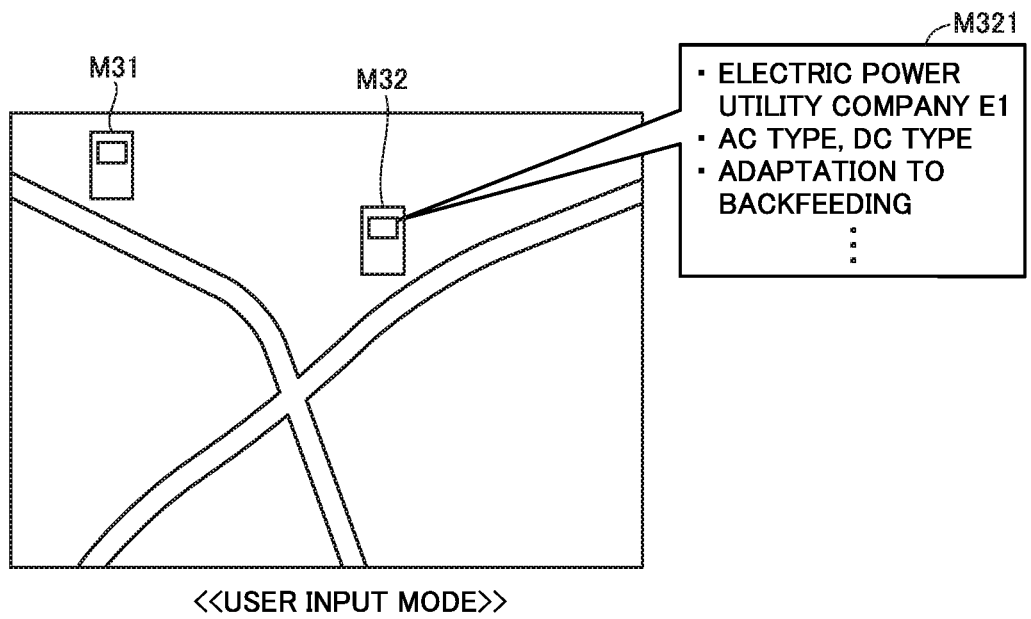
FIG. 13 is a diagram showing an exemplary notification screen shown in the processing in FIG. 12.

FIG. 13 is a diagram showing an exemplary screen shown on TPD 302 in S34 in FIG. 12. Referring to FIG. 13, in this example, TPD 302 shows a map around the target position input by the user. The screen shown in FIG. 13 (which is also referred to as a "third notification screen" below) includes images M31 and M32 and a balloon section M321. Each of images M31 and M32 shows a position of the charging facility on the map. In particular, image M32 shows a position of the charging facility (that is, the first target facility) located at the target position input by the user. Balloon section M321 shows that electric power utility company E1 is set as the electric utility that manages the first target facility (that is, the first information), that the first target facility is adapted to both of the AC type and the DC type (that is, the third information), and that the first target facility is adapted to backfeeding (that is, the fourth information). The third notification screen thus gives the first information, the third information, and the fourth information.

Any method of giving the first information, the third information, and the fourth information is applicable, without being limited as above. Though the third notification screen gives the first information, the third information, and the fourth information, it is not essential that the third information and the fourth information are given in S34 in FIG. 12. Only the first information may be given in S34 in FIG. 12.

Referring again to FIG. 12, when the user provides no input of the target position (NO in S31), second input unit 202b determines in S35 whether or not the user has provided an input of the electric utility (more specifically, the target managerial utility) to NAVI system 300 (for example, TPD 302, operation button 305, or speaker 306).

When the user has provided the input of the target managerial utility (YES in S35), second input unit 202b sets in S36 the target managerial utility input by the user in second notification unit 202. The charging facility managed by the target managerial utility input by the user is thus set as the second target facility in second notification unit 202. In S37, second notification unit 202 requests obtaining unit 203 to obtain the facility information on the second target facility. Hereinafter, the facility information on the second target facility will be referred to as "second user facility information." Obtaining unit 203 then obtains the second user facility information from the facility information DB in response to the request from second notification unit 202. In S38, second notification unit 202 receives the second user facility information from obtaining unit 203 and causes TPD 302 of NAVI system 300 to give the previously-described second information by using the second user facility information. A screen shown on TPD 302 in S38 (which is also referred to as a "fourth notification screen" below) may be a screen, for example, in accordance with the second notification screen (FIG. 11) described previously. Mark M22 can indicate the position of the second target facility (that is, the second information) on the map. The fourth notification screen, however, does not show display section M24. In S38 in FIG. 12, the third information and the fourth information may be given in addition to the second information.

As set forth above, in the user input mode, first notification unit 201 causes TPD 302 to give the first information that indicates the electric utility that manages the charging facility located at the target position input to first input unit 201b by the user (S34 in FIG. 12). The user can set any target position in first notification unit 201 through NAVI system 300 and first input unit 201b. The user can then know the managerial utility of the charging facility located at the input target position based on the first information given by first notification unit 201 (for example, balloon section M321 in FIG. 13). Second notification unit 202 causes TPD 302 to give the second information that indicates the position of the charging facility managed by the target managerial utility input to second input unit 202b by the user (S38 in FIG. 12). The user can set any target managerial utility in second notification unit 202 through NAVI system 300 and second input unit 202b. The user can know the position of the charging facility managed by the input target managerial utility based on the second information given by second notification unit 202.

As described above, according to the vehicle (EV 50) according to this embodiment, the user is given the first information and the second information in the nearby area mode, the DR mode, and the user input mode. According to such EV 50, the user more readily identifies the charging facility managed by the contracted utility while the user is on board EV 50. For example, when the user is requested by the contracted utility to participate in demand response (DR) while EV 50 is traveling, the user can identify a public facility (a public charging facility) managed by the contracted utility based on the first information given by first notification unit 201 and the second information given by second notification unit 202 and participate in DR by using the identified public facility. The user more readily participates in DR by using the public facility even though the user is requested to participate in DR at a position distant from his/her home.

In the embodiment, mode switching unit 206 switches among the notification modes of ECU 200 based on the input from the user. Without being limited as such, mode switching unit 206 may switch among the notification modes of ECU 200 when a prescribed switching condition is satisfied, regardless of an input from the user. For example, when a prescribed first switching condition is satisfied (for example, when NAVI system 300 is started up and navigating), mode switching unit 206 may switch the notification mode of ECU 200 to the nearby area mode (for example, the notification mode in which processing in S11 to S14 in FIG. 8 is performed). When a prescribed second switching condition is satisfied (for example, the DR start timing will come within a prescribed time period from the current time), mode switching unit 206 may switch the notification mode of ECU 200 to the DR mode (for example, the notification mode in which processing in S22 to S25 in FIG. 10 is performed). When a prescribed third switching condition is satisfied (for example, when the user inputs a target position), mode switching unit 206 may switch the notification mode of ECU 200 to a first user input mode (for example, the notification mode in which processing in S32 to S34 in FIG. 12 is performed). When a prescribed fourth switching condition is satisfied (for example, when the user inputs a target managerial utility), mode switching unit 206 may switch the notification mode of ECU 200 to a second user input mode (for example, the notification mode in which processing in S36 to S38 in FIG. 12 is performed). When two or more of the first to fourth switching conditions are simultaneously satisfied, mode switching unit 206 may switch to the notification mode higher in priority, in accordance with predetermined priority for the notification modes of ECU 200 (for example, the nearby area mode, the DR mode, the first user input mode, and the second user input mode).

Second Embodiment

A car navigation system according to a second embodiment of the present disclosure will be described. Since the second embodiment is in common to the first embodiment in many aspects, differences will mainly be described and description of aspects in common will not be provided.

Figure 14:
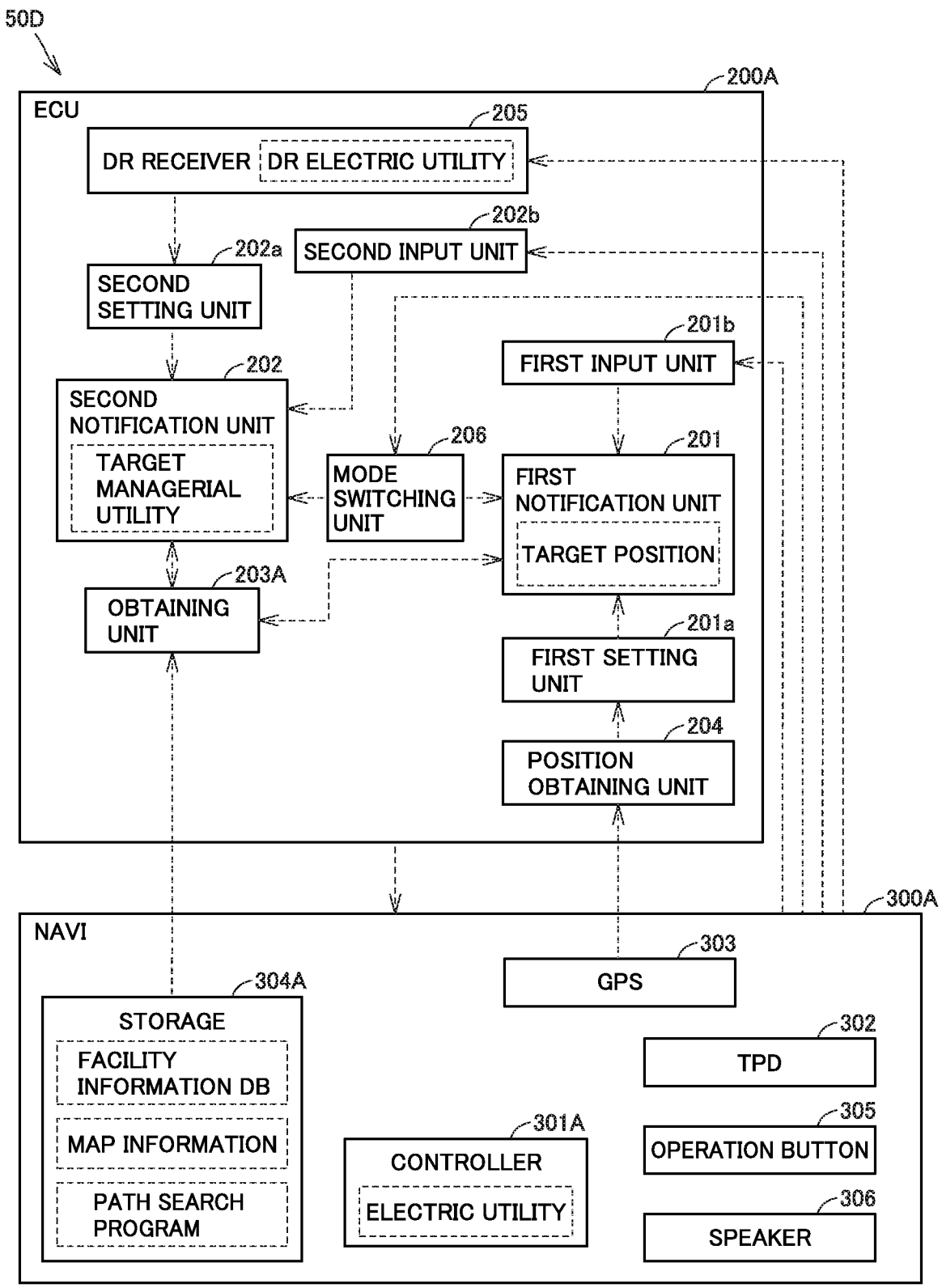
FIG. 14 is a diagram showing a car navigation system according to a second embodiment of the present disclosure.

FIG. 14 is a diagram showing the car navigation system according to the second embodiment. Referring to FIG. 14, an ECU 200A and a NAVI system 300A are mounted on an electric vehicle (EV) 50D. NAVI system 300A includes a controller 301A, TPD 302, GPS module 303, a storage 304A, operation button 305, and speaker 306. TPD 302 is controlled by controller 301A. Storage 304A stores map information, the facility information DB (see, for example, FIG. 7), and a path search program.

NAVI system 300A is configured basically similarly to NAVI system 300 (see FIG. 3) according to the first embodiment. Controller 301A in NAVI system 300A controls TPD 302, by using the map information and the facility information DB, to show the charging facility managed by a prescribed electric utility (electric power utility company E1 shown in FIG. 1 in this embodiment) on a map as being distinguished from a charging facility managed by another electric utility. A user can set the prescribed electric utility in controller 301A, for example, through TPD 302, operation button 305, or speaker 306. Controller 301A and TPD 302 according to this embodiment correspond to an exemplary "controller" and an exemplary "display apparatus" in the car navigation system according to the present disclosure, respectively. Storage 304A according to this embodiment functions as both of a "first storage" and a "second storage" of the car navigation system according to the present disclosure.

Figure 15:
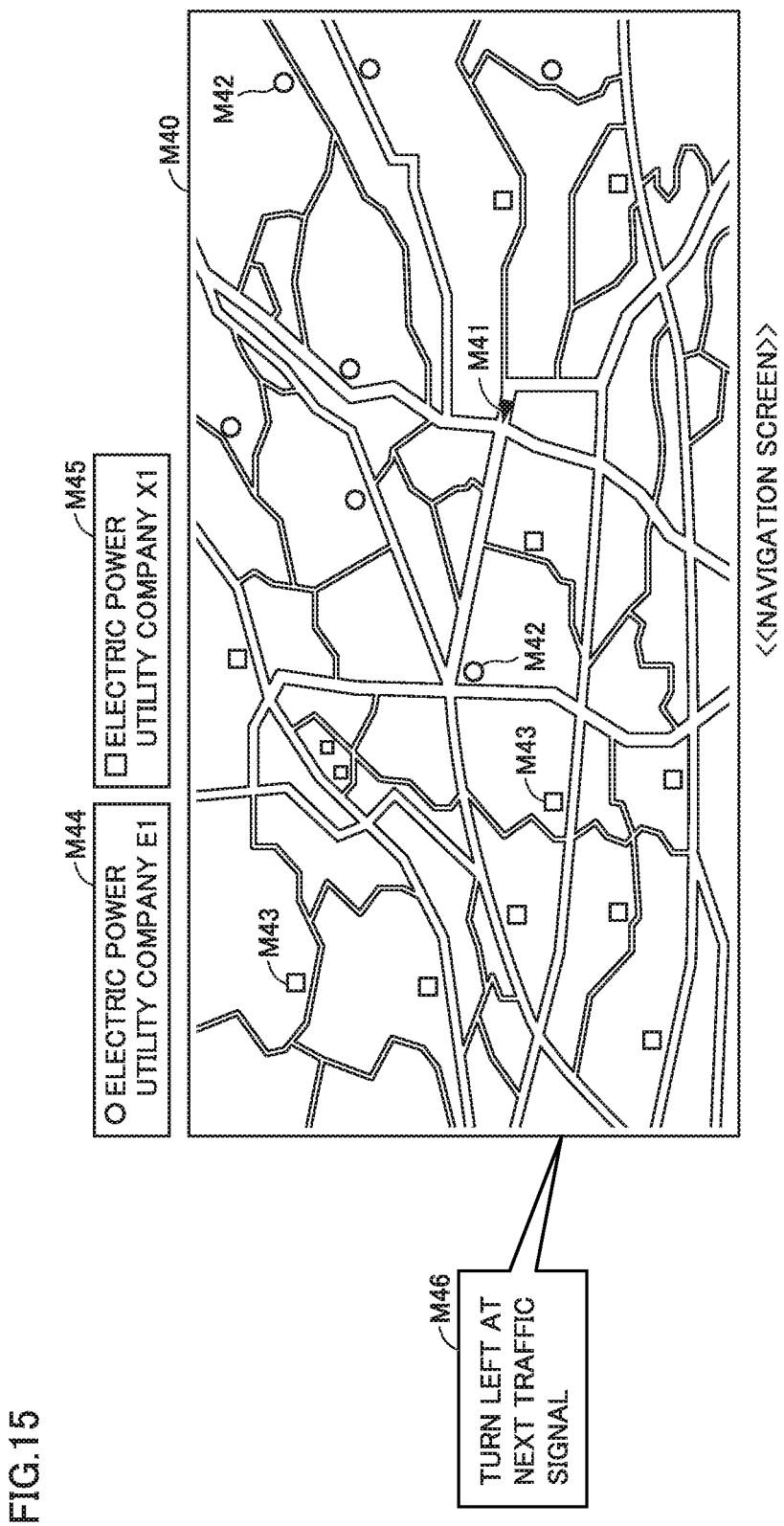
FIG. 15 is a diagram showing an exemplary screen shown by the car navigation system according to the second embodiment of the present disclosure.

FIG. 15 is a diagram showing an exemplary screen shown by the car navigation system according to the second embodiment. Electric power utility company E1 and electric power utility company X1 in FIG. 15 correspond to electric power utility company E1 and electric power utility company X1 shown in FIG. 7, respectively.

Referring to FIG. 15 together with FIG. 14, controller 301A navigates to a destination, for example, by having TPD 302 show a screen shown in FIG. 15 (which is also referred to as a "navigation screen" below). Though the navigation screen does navigation by using a balloon section M46, navigation may be done by voice and sound.

The navigation screen shown in FIG. 15 further includes display sections M40, M44, and M45 in addition to balloon section M46. Display section M40 shows a map of an area around EV 50D. Display section M40 includes a mark M41 indicating a position of EV 50D on the map, a mark M42 indicating a charging facility managed by electric power utility company E1 on the map, and a mark M43 indicating a charging facility managed by electric power utility company X1 on the map. Marks M42 and M43 are different in shape from each other. In the navigation screen shown in FIG. 15, mark M42 is circular and mark M43 is quadrangular. Each of marks M42 and M43 gives a notification about the position of the charging facility by showing the charging facility on the map. Display section M44 shows that electric power utility company E1 is the electric utility that manages the charging facility shown with mark M42 in display section M40. Display section M45 shows that electric power utility company X1 is the electric utility that manages the charging facility shown with mark M43 in display section M40.

In the navigation screen, a charging facility (which is also referred to as a "first managed facility" below) managed by a prescribed electric utility (for example, electric power utility company E1) is shown on the map as being distinguished from a charging facility (which is also referred to as a "second managed facility" below) managed by another electric utility (for example, electric power utility company X1). A method of distinguishing between the first managed facility and the second managed facility on the map is not limited as above. The first managed facility and the second managed facility may be distinguished from each other on the map by changing at least one of a size and a color rather than a shape of the mark indicating each charging facility on the map. The mark indicating each charging facility on the map is not limited to a graphics such as a circle, a triangle, or a quadrangle, but may be a number, a character, an image (for example, an icon), or combination thereof.

An obtaining unit 203A in ECU 200A included in EV 50D shown in FIG. 14 obtains facility information from storage 304A of NAVI system 300A. ECU 200A according to this embodiment gives a notification (for example, a notification in the nearby area mode, the DR mode, and the user input mode described previously) to a user by using facility information received from NAVI system 300A.

NAVI system 300A according to this embodiment shows a charging facility managed by a prescribed electric utility (for example, electric power utility company E1) on the map as being distinguished from a charging facility managed by another electric utility (see FIG. 15). The user can readily identify the charging facility managed by electric power utility company E1 by looking at the map shown on TPD 302. In NAVI system 300A according to the embodiment, the map information and the facility information DB are contained in the same storage 304A, however, the map information and the facility information DB may separately be contained in different storages.

Third Embodiment

An information providing apparatus according to a third embodiment of the present disclosure will be described. Since the third embodiment is in common to the first embodiment in many aspects, differences will mainly be described and description of aspects in common will not be provided.

Figure 16:
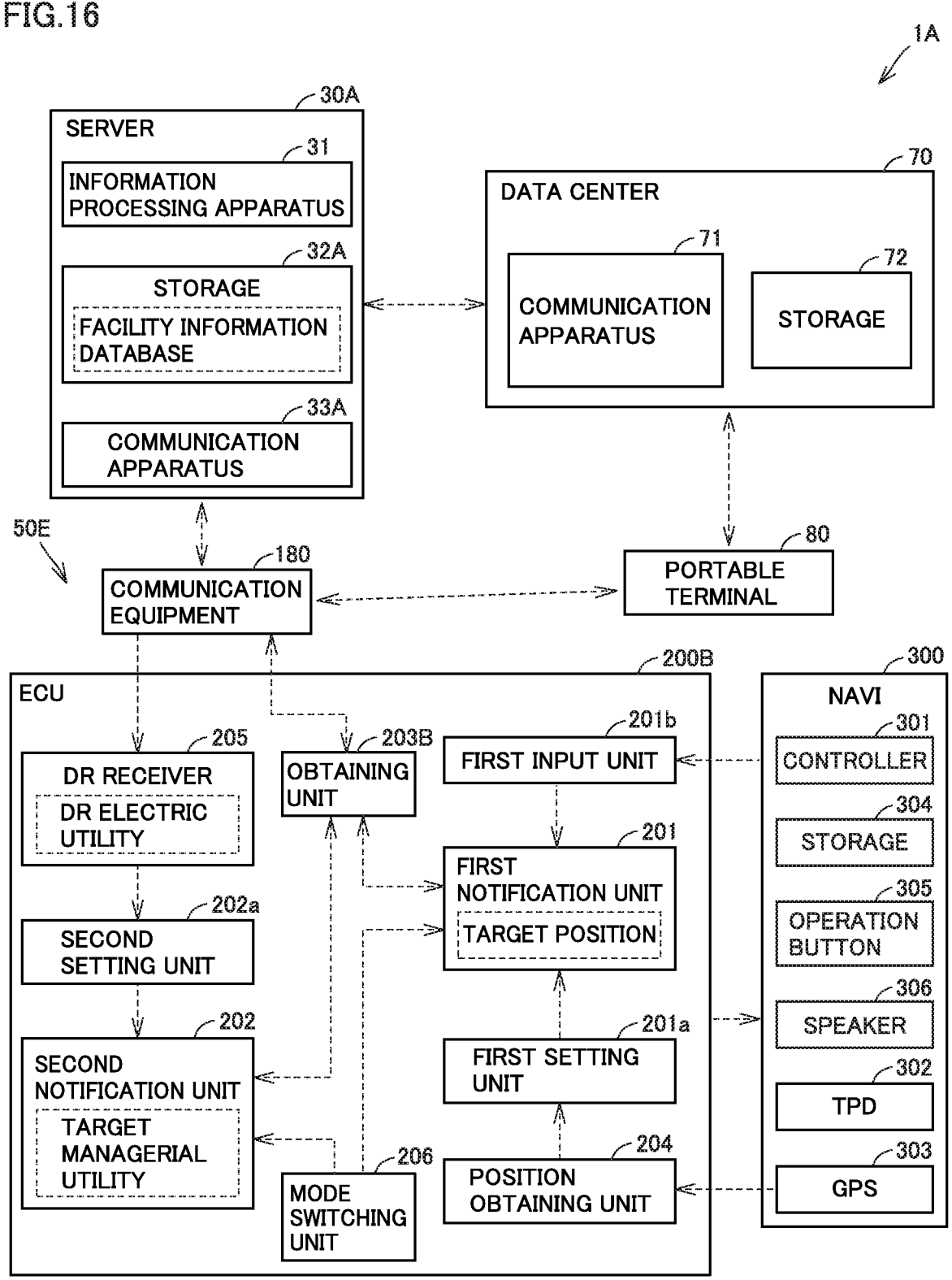
FIG. 16 is a diagram showing a VGI system including an information providing apparatus according to a third embodiment of the present disclosure.

FIG. 16 is a diagram showing a VGI system including the information providing apparatus according to the third embodiment. Referring to FIG. 16, a VGI system 1A includes a server 30A, data center 70, portable terminal 80, communication equipment 180, an ECU 200B, and NAVI system 300. Communication equipment 180, ECU 200B, and NAVI system 300 are mounted on an electric vehicle (EV) 50E. VGI system 1A is configured basically similarly to VGI system 1 (see FIG. 6) according to the first embodiment. An obtaining unit 203B in ECU 200B, however, requests server 30A to transmit facility information when first notification unit 201 or second notification unit 202 requests obtaining unit 203B to obtain the facility information. A storage 32A in server 30A stores the facility information DB (for example, see FIG. 7). A communication apparatus 33A in server 30A transmits position information and utility information included in the facility information DB in storage 32A. A configuration of each of obtaining unit 203B and communication apparatus 33A will be described in detail below.

Obtaining unit 203B transmits a signal (which is also referred to as an "information provision request" below) requesting transmission of facility information to server 30A in response to a request from first notification unit 201 or second notification unit 202. When first notification unit 201 requests the obtaining unit to obtain facility information and a target position designated by first notification unit 201 is a position of a single charging facility, obtaining unit 203B transmits the information provision request that designates the position of that single charging facility to server 30A. Hereinafter, the information provision request that designates the position of the single charging facility will be referred to as "first information provision request." When first notification unit 201 requests the obtaining unit to obtain facility information and a target position designated by first notification unit 201 is a region, obtaining unit 203B transmits the information provision request that designates the region to server 30A. Hereinafter, the information provision request that designates the region will be referred to as "second information provision request." When second notification unit 202 requests the obtaining unit to obtain facility information, obtaining unit 203B transmits the information provision request that designates a managerial utility of the second target facility (that is, a target managerial utility) designated by second notification unit 202 to server 30A. Hereinafter, the information provision request that designates the managerial utility of the second target facility designated by second notification unit 202 will be referred to as "third information provision request." The first to third information provision requests are transmitted from obtaining unit 203B through communication equipment 180 to server 30A.

Similarly to communication apparatus 33 (see FIG. 6) in VGI system 1, communication apparatus 33A transmits to communication equipment 180 of EV 50E, a demand response (DR) signal that represents a content of DR requested by a DR electric utility (electric power utility company E1 in this embodiment). Communication equipment 180 of EV 50E is registered in advance in server 30A. When communication apparatus 33A receives the first information provision request from communication equipment 180, it transmits utility information associated with a position of the charging facility designated by the first information provision request, by referring to the facility information DB in storage 32A, to communication equipment 180. When communication apparatus 33A receives the second information provision request from communication equipment 180, it transmits the position information and the utility information for each charging facility as being associated with each other, for all charging facilities located within the region designated by the second information provision request, by referring to the facility information DB in storage 32A, to communication equipment 180. When communication apparatus 33A receives the third information provision request from communication equipment 180, the communication apparatus transmits position information associated with an electric utility (the target managerial utility) designated by the third information provision request, by referring to the facility information DB in storage 32A, to communication equipment 180.

Figure 17:
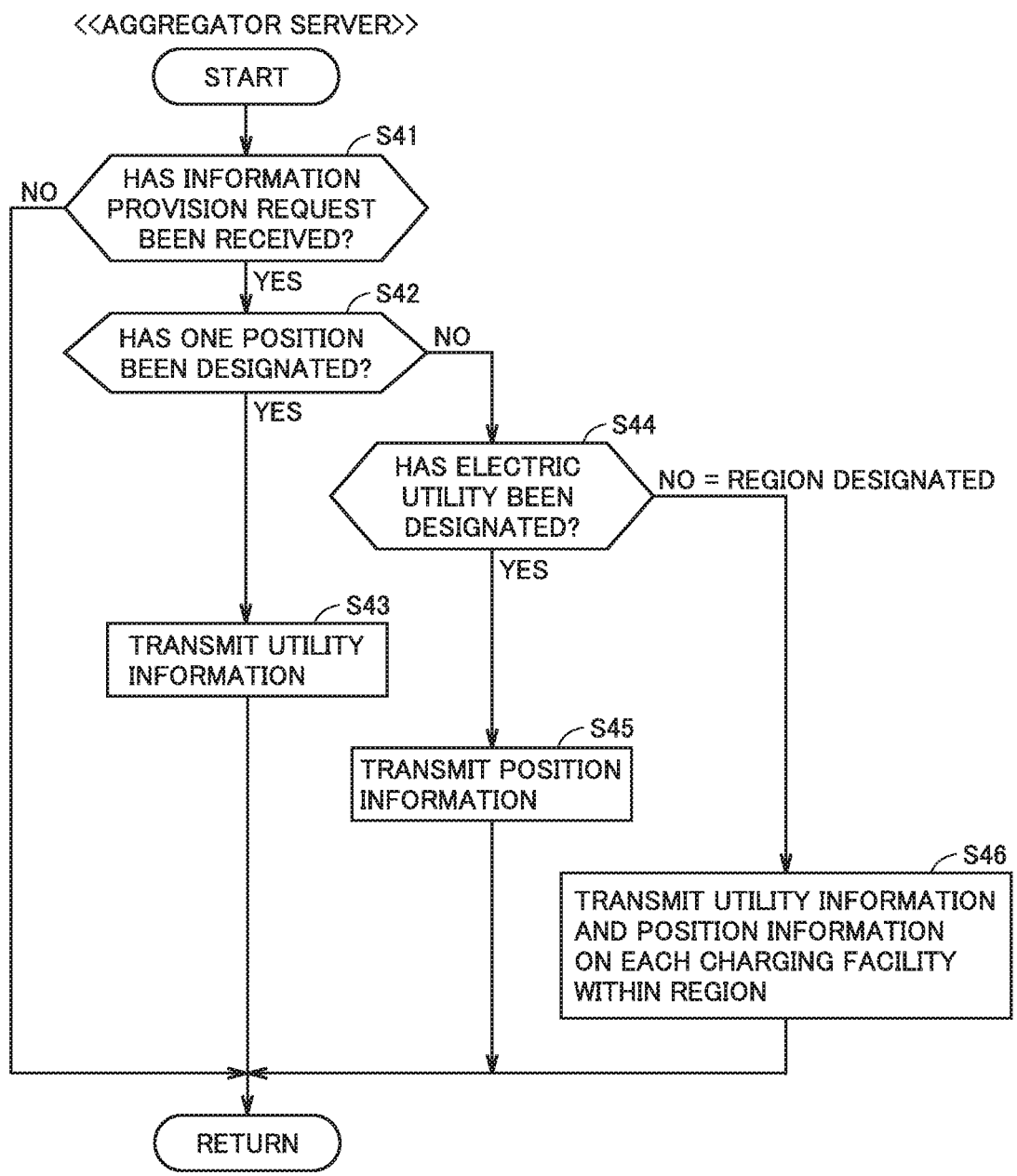
FIG. 17 is a flowchart showing processing performed by a communication apparatus of the information providing apparatus according to the third embodiment of the present disclosure.

FIG. 17 is a flowchart showing processing performed by communication apparatus 33A of server 30A. Processing shown in this flowchart is repeatedly performed in prescribed cycles.

Referring to FIG. 17 together with FIG. 16, in S41, whether or not communication apparatus 33A has received an information provision request is determined. While communication apparatus 33A receives no information provision request (that is, a period while determination as NO is made in S41), processing in S41 is repeatedly performed.

When communication apparatus 33A has received the information provision request from communication equipment 180 of EV 50E (YES in S41), communication apparatus 33A determines in S42 whether or not the information provision request has designated a position of a single charging facility. The information provision request designating a position of a single charging facility means that the information provision request is the first information provision request. When the information provision request is the first information provision request (YES in S42), in S43, communication apparatus 33A transmits utility information (see, for example, FIG. 7) associated with the position of the charging facility designated by the information provision request, by referring to the facility information DB in storage 32A, to communication equipment 180. When the information provision request is not the first information provision request (NO in S42), communication apparatus 33A determines in S44 whether or not the information provision request designates an electric utility. The information provision request designating an electric utility means that the information provision request is the third information provision request. When the information provision request is the third information provision request (YES in S44), in S45, communication apparatus 33A transmits position information (for example, see FIG. 7) associated with the electric utility designated by the information provision request, by referring to the facility information DB in storage 32A, to communication equipment 180.

In this embodiment, the information provision request that can be received from communication equipment 180 of EV 50E by communication apparatus 33A is only the first to third information provision requests described previously. Therefore, determination of the information provision request as not being the third information provision request (NO in S44) means that the information provision request is the second information provision request. When the information provision request is the second information provision request (NO in S44), in S46, communication apparatus 33A transmits position information and utility information (see, for example, FIG. 7) for each charging facility as being associated with each other, for all charging facilities located within the region designated by the information provision request, by referring to the facility information DB in storage 32A, to communication equipment 180.

Server 30A can transmit information useful for identifying a charging facility managed by a prescribed electric utility (for example, electric power utility company E1) to communication equipment 180 of EV 50E. When EV 50E is requested, for example, by an electric utility to participate in DR, EV 50E can go to the charging facility managed by the electric utility based on information transmitted from server 30A, and can perform charging or discharging in accordance with DR by using that charging facility.

EV 50E may have an autonomous driving function. EV 50E may be capable of unmanned traveling. EV 50E may travel to the charging facility based on autonomous driving (for example, autonomous driving in an unmanned state).

ECU 200B may determine a destination (for example, a target charging facility) based on information received from communication apparatus 33A (for example, information transmitted in any of S43, S45, and S46 in FIG. 17) and may cause EV 50E to travel to the determined destination based on autonomous driving.

Server 30A (an aggregator server) according to this embodiment corresponds to an exemplary "information providing apparatus" according to the present disclosure. In the embodiment, though each of obtaining unit 203B and communication apparatus 33A addresses all of the first to third information provision requests, each of obtaining unit 203B and communication apparatus 33A may be modified to address only two or one of the first to third information provision requests. Portable terminal 80 may be registered in server 30A as communication equipment of EV 50E. Communication apparatus 33A may transmit information to portable terminal 80 instead of communication equipment 180 of EV 50E. Though FIG. 16 does not show second input unit 202b (FIG. 6), ECU 200B may include second input unit 202b.

Other Embodiments

The configuration of the VGI system is not limited to the configuration shown in FIG. 1. For example, electric power utility company E1 may be divided for each business sector. A power generation utility and a power distribution utility included in the VGI system may belong to companies different from each other. Though the aggregator is divided into upper aggregator E2 and lower aggregator E3 in VGI system 1 shown in FIG. 1, upper aggregator E2 and lower aggregator E3 may be integrated. An electric utility that manages a charging facility is not limited to an electric power utility company but may be another electric utility (for example, an aggregator). One charging facility may be managed by a plurality of electric utilities. First notification unit 201 may give a notification about all of a plurality of managerial utilities or a notification about only a prescribed managerial utility (for example, a managerial utility that requests DR) among a plurality of managerial utilities.

A content in the facility information database is not limited to the content shown in FIG. 7. At least one of type information and backfeeding information in the facility information database shown in FIG. 7 does not have to be associated with identification information of the charging facility (facility ID). Only position information and utility information may be associated with a facility ID.

A configuration of the electrically powered vehicle included in the VGI system is not limited to the configuration shown in FIG. 3. It is not essential that the electrically powered vehicle includes a power feeder. For example, a charger capable of only charging may be adopted instead of charger-discharger 150 in the configuration shown in FIG. 3. The electrically powered vehicle is not limited to an electric vehicle (EV) and at least one or all of electrically powered vehicles included in the VGI system may be a plug-in hybrid vehicle (PHV).

Though first notification unit 201, first setting unit 201a, first input unit 201b, second notification unit 202, second setting unit 202a, second input unit 202b, obtaining unit 203, position obtaining unit 204, DR receiver 205, and mode switching unit 206 are mounted on EV 50 in the configuration shown in FIG. 6, each of them may be mounted on portable terminal 80. It is not essential that both of first notification unit 201 and second notification unit 202 are mounted on EV 50 or portable terminal 80, and only one of first notification unit 201 and second notification unit 202 may be mounted thereon.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A vehicle comprising:
   a power storage that stores electric power for traveling; and
   a controller configured to:
   obtain a location of a charging facility that is able to charge the power storage, the charging facility being located within a predetermined area around a target position,
   obtain a name of an electric utility that manages the charging facility,
   display the location of the charging facility, and
   display the name of the electric utility that manages the charging facility.

2. The vehicle according to claim 1, wherein the controller is further configured to:
   obtain a position of the vehicle,
   set the position of the vehicle as the target position, and
   when there are a plurality of charging facilities in the predetermined area around the target position, display the location of each of the plurality of charging facilities.

3. The vehicle according to claim 1, wherein the controller is further configured to:
   accept an input of the target position by a user.

4. The vehicle according to claim 1, wherein the controller is further configured to
   accept an input of the name of the electric utility by a user.

5. The vehicle according to claim 1, wherein the controller is further configured to
   receive a DR signal that represents a content of demand response requested by a designated DR electric utility, and
   set the DR electric utility as the electric utility when a timing of a start of a demand response indicated by the DR signal will come within a prescribed time period from a current time.

6. The vehicle according to claim 1, wherein the controller is further configured to:
   receive a charging type of the charging facility, and
   display the charging type of the charging facility.

7. The vehicle according to claim 1, further comprising a storage that contains a facility information database for a plurality of charging facilities that charge the power storage, the facility information database indicating a position of each charging facility, and the name of the electric utility that manages each charging facility, wherein
   the controller obtains the location of the charging facility and the name of the electric utility that manages the charging facility from the facility information database.

8. The vehicle according to claim 1, wherein the controller is configured to display the location of the charging facility and the name of the electric utility that manages the charging facility via at least one of a meter panel of the vehicle, a car navigation system mounted on the vehicle, a display provided on a windshield of the vehicle, a smart speaker mounted on the vehicle, and a portable terminal.

9. The vehicle according to claim 1, further comprising a power feeder that supplies electric power stored in the power storage to the charging facility, wherein the controller is further configured to:
   receive backfeeding information indicating whether the charging facility is adapted to backfeeding, and
   display an indication as to whether the charging facility is adapted to backfeeding.

10. The vehicle according to claim 1, further comprising a car navigation system, wherein:
   the controller is further configured to control the car navigation system to show a first notification screen when the car navigation system is started and navigating, the first notification screen including a map of the area around the target position and showing information that indicates the electric utility that manages the charging facility, information that indicates a charging type of the charging facility, and information that indicates whether or not the charging facility is adapted to backfeeding for each of the charging facilities on the map.

11. The vehicle according to claim 10, wherein the controller is further configured to:
   receive a DR signal that represents a content of demand response requested by the electric utility; and
   control the car navigation system to show a second notification screen when timing of start of the demand response will come within a prescribed time period from current time, the second notification screen including a first display section, a second display section, and a third display section, the first display section showing a position of each of the charging facility managed by the electric utility that requests the demand response on a map, the second display section showing the name of the electric utility that requests the demand response, and the third display section showing that the demand response will soon be started or the demand response has already been started.

12. A car navigation system comprising:
   a first storage that contains map information;
   a second storage that contains a facility information database for a plurality of charging facilities that charge an electrically powered vehicle, the facility information database storing a position of each charging facility, and a name of an electric utility that manages each charging facility;
   a display apparatus; and
   a controller that controls the display apparatus, by using the map information and the facility information database, to show on a map, the charging facility managed by a prescribed electric utility as being distinguished from the charging facility managed by another electric utility.

13. An information providing apparatus comprising:
   a storage that contains a facility information database for a plurality of charging facilities that charge an electrically powered vehicle, the facility information database storing a position of each charging facility, and a name of an electric utility that manages each charging facility; and
   a communication apparatus that transmits at least one of the position of a charging facility and a name of an electric utility that manages the charging facility.

14. The information providing apparatus according to claim 13, wherein
   the communication apparatus transmits to communication equipment of the electrically powered vehicle, a DR signal that represents a content of demand response requested by a designated DR electric utility.

15. The information providing apparatus according to claim 13, wherein
   when the communication apparatus receives an information provision request that designates a position of one charging facility from communication equipment of the electrically powered vehicle, the communication apparatus transmits the position of the charging facility designated in the information provision request and the name of the electric utility that manages the charging facility designated in the information provision request, by referring to the facility information database, to the communication equipment of the electrically powered vehicle.

16. The information providing apparatus according to claim 13, wherein
   when the communication apparatus receives an information provision request that designates an electric utility that manages the charging facility from communication equipment of the electrically powered vehicle, the communication apparatus transmits the position of the electric utility designated in the information provision request, by referring to the facility information database, to the communication equipment of the electrically powered vehicle.

17. The information providing apparatus according to claim 13, wherein
   when the communication apparatus receives an information provision request that designates a region from communication equipment of the electrically powered vehicle, the communication apparatus transmits the position of all charging facilities located within the region designated in the information provision request and the name of the electric utility managing each of the charging facilities located within the region designated in the information provision request, by referring to the facility information database, to the communication equipment of the electrically powered vehicle.

* * * * *